US005992686A

United States Patent [19]
Cline et al.

[11] Patent Number: 5,992,686
[45] Date of Patent: Nov. 30, 1999

[54] METHOD AND APPARATUS FOR DISPENSING LIQUIDS AND SOLIDS

[75] Inventors: David J. Cline, Long Beach; Timothy S. Clark, San Francisco; Stephen P. Gordon, Costa Mesa; Michael R. Engle, Long Beach, all of Calif.

[73] Assignee: Fluid Research Corporation, Costa Mesa, Calif.

[21] Appl. No.: 09/032,404

[22] Filed: Feb. 27, 1998

[51] Int. Cl.⁶ .......................................... B67B 7/00
[52] U.S. Cl. ................... 222/1; 222/55; 222/63; 222/135
[58] Field of Search ................... 222/1, 55, 63, 222/639, 135

[56] References Cited

U.S. PATENT DOCUMENTS

| | | | |
|---|---|---|---|
| 4,170,319 | 10/1979 | Suh et al. ............................... | 222/134 |
| 4,311,586 | 1/1982 | Baldwin et al. ....................... | 210/101 |
| 4,341,327 | 7/1982 | Zeitz ..................................... | 222/63 |
| 4,407,431 | 10/1983 | Hutter, III ............................. | 222/1 |
| 4,487,333 | 12/1984 | Pounder et al. ...................... | 222/54 |
| 4,493,286 | 1/1985 | Carson .................................. | 118/677 |
| 4,538,221 | 8/1985 | Crain et al. ........................... | 364/172 |
| 4,547,128 | 10/1985 | Hayes .................................... | 417/2 |
| 4,635,825 | 1/1987 | Tulasne ................................. | 222/129.1 |
| 4,719,574 | 1/1988 | Duback et al. ........................ | 364/468 |
| 4,789,100 | 12/1988 | Senf ....................................... | 239/61 |
| 4,830,218 | 5/1989 | Shirkhan .............................. | 222/52 |
| 4,854,482 | 8/1989 | Bergner ................................ | 222/94 |
| 4,871,262 | 10/1989 | Krauss et al. ........................ | 366/160 |
| 4,892,410 | 1/1990 | Snow et al. ........................... | 366/2 |
| 5,018,645 | 5/1991 | Zinsmeyer ............................ | 222/14 |
| 5,033,644 | 7/1991 | Tentler ................................. | 222/57 |
| 5,139,045 | 8/1992 | Ensign .................................. | 137/114 |
| 5,163,010 | 11/1992 | Klein et al. ............................ | 364/479 |
| 5,192,000 | 3/1993 | Wandrick et al. .................... | 222/59 |
| 5,228,594 | 7/1993 | Aslin ..................................... | 222/63 |
| 5,257,720 | 11/1993 | Wulc et al. ........................... | 222/20 |
| 5,271,521 | 12/1993 | Noss et al. ............................ | 222/1 |
| 5,291,951 | 3/1994 | Morand ................................ | 169/14 |
| 5,330,072 | 7/1994 | Ferri, Jr. et al. ..................... | 222/1 |
| 5,332,125 | 7/1994 | Schmitkons et al. ................ | 222/1 |
| 5,340,210 | 8/1994 | Patel et al. ........................... | 366/132 |
| 5,344,044 | 9/1994 | Hayden et al. ...................... | 222/1 |
| 5,383,581 | 1/1995 | LeMarbe et al. .................... | 222/459 |
| 5,388,761 | 2/1995 | Langeman ........................... | 239/1 |
| 5,407,267 | 4/1995 | Davis et al. ........................... | 366/152 |
| 5,409,310 | 4/1995 | Owczarz ............................... | 366/136 |
| 5,417,346 | 5/1995 | Ferri, Jr. et al. ..................... | 222/61 |
| 5,857,589 | 1/1999 | Cline et al. ........................... | 222/1 |

OTHER PUBLICATIONS

"Seepex User Advantages. A Complete Explanation" brochure, ADV 2.94e, 14 pgs.

*Primary Examiner*—Kenneth Bomberg
*Attorney, Agent, or Firm*—Lyon & Lyon LLP

[57] ABSTRACT

A system for metering and dispensing single and plural component liquids and solids as described herein. The dispensing system has a microprocessor-based control system and progressive cavity pumps which provide a very accurate control of component ratios, shot sizes, flow rates and dispense durations. The system has numerous feedback components for accurately controlling the pressure, flow rates, fluid levels and amounts of fluids dispensed. Where a valved nozzle is used, the pressure in the flow system is used to control the pumps rather than the valve. Such a system may be used as a sprayer with compressed air added. Drum rams are associated with the supply drums and the progressive cavity pumps may be placed on the drum ram. Maintenance of a steady state in the system is accomplished with back and forth movement of the pump, with compensation for pressure changes. Absolute rotational position of the pump can be monitored when a set pressure is maintained, to diagnose system conditions. A high flow system uses ball valves and a releasably coupled manifold. A mold charging system uses pressure to control the pumps which are cycled on and off to avoid overpressurizing the mold. The rate of pressure increase is used to control the rate of flow from the pumps as the mold approaches completion of the charge, again to avoid overpressurizing the mold. A signal controlled by a timer can indicate elapsed time as a warning that material within the mixer conduit is hardening to a condition such that flow cannot be reinitiated.

34 Claims, 26 Drawing Sheets

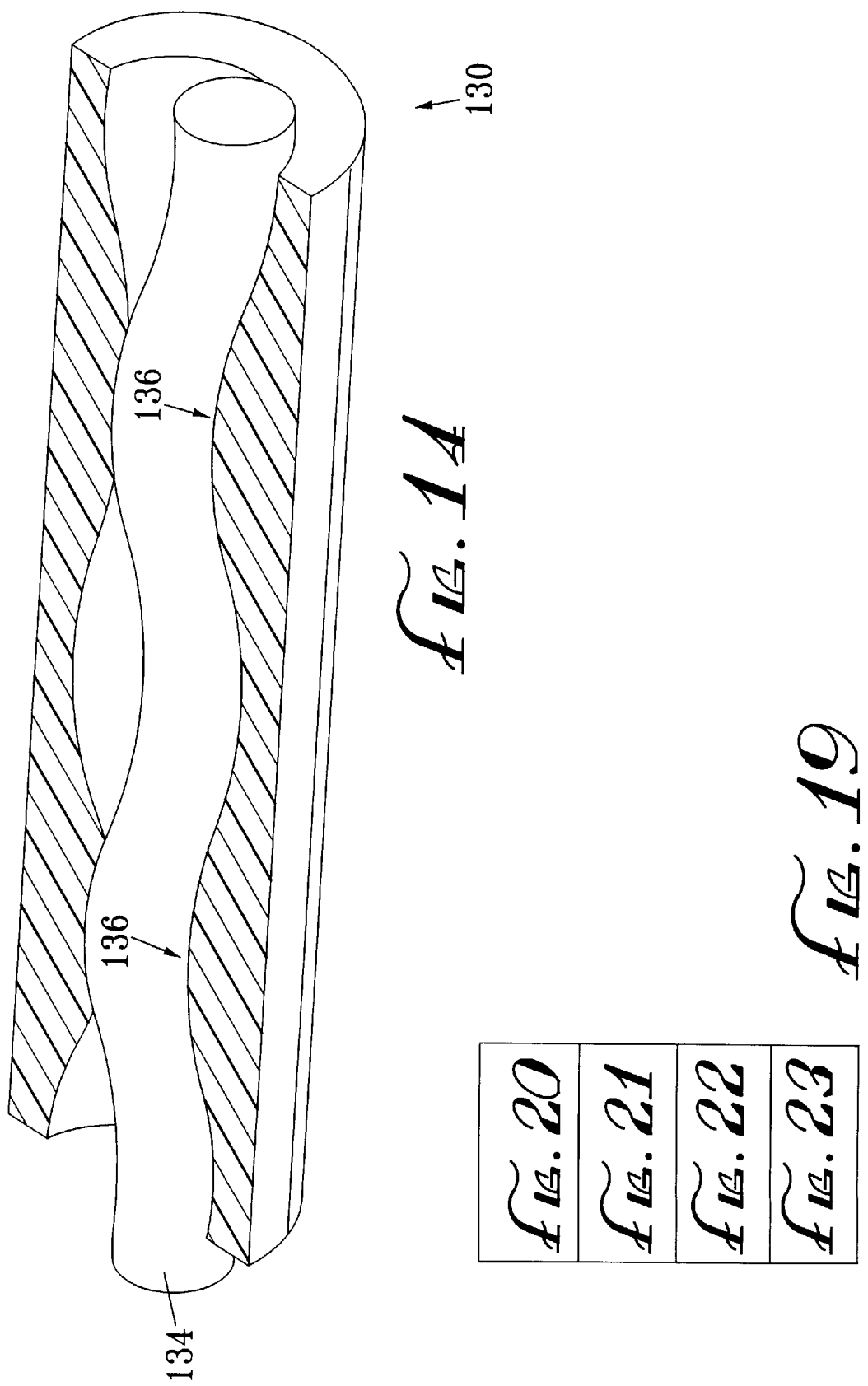

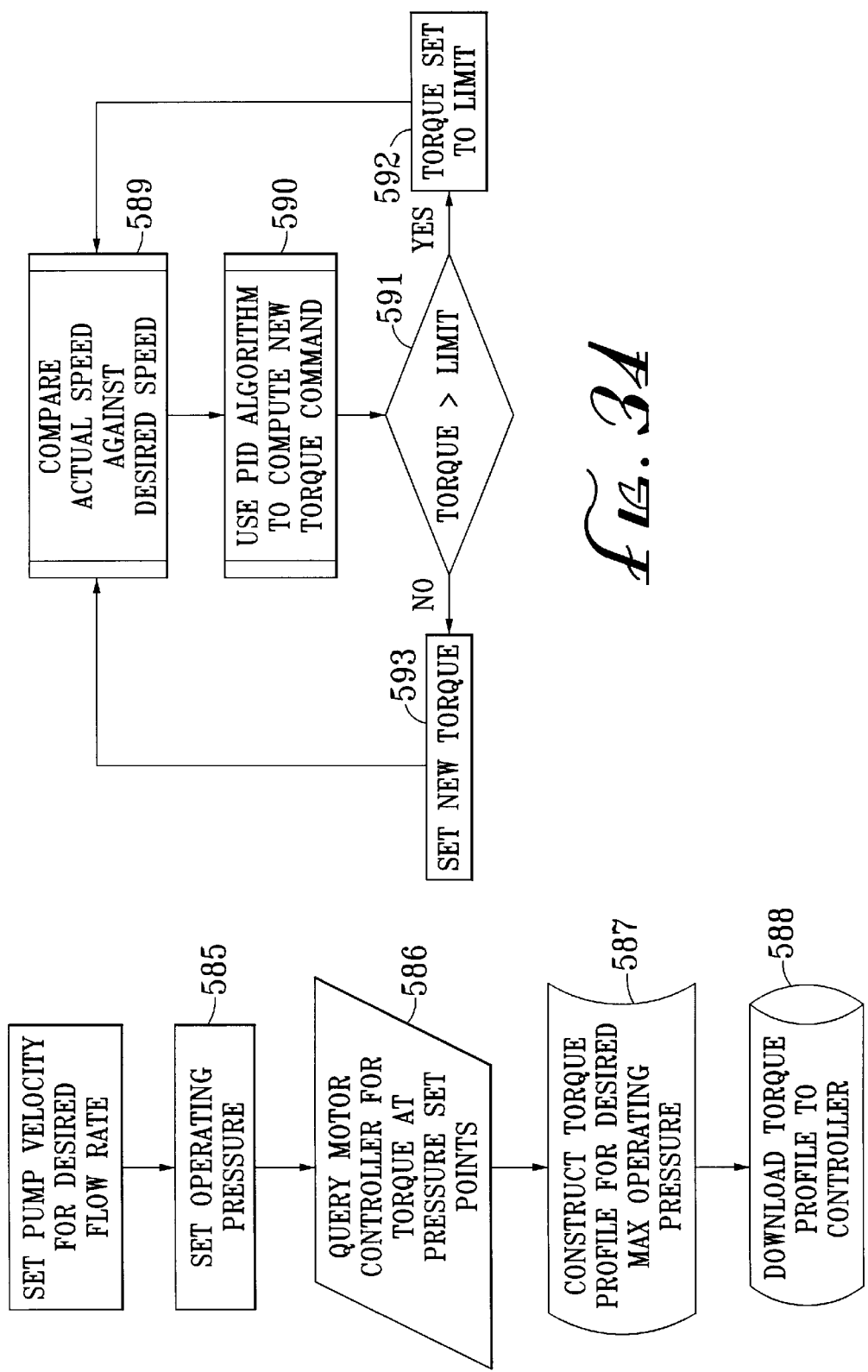

METHOD AND APPARATUS FOR DISPENSING LIQUIDS AND SOLIDS

TECHNICAL FIELD

The field of the present invention is devices that meter and dispense singular and plural component liquids and solids and methods of dispensing same.

BACKGROUND OF THE INVENTION

Systems for mixing and dispensing singular and multi-component materials are well known in the art. An almost infinite variety of substances may be dispensed. Many materials are packaged through dispensing in a fluid or semifluid state. Paint is sprayed, molds are pressure charged with materials, and electronic devices are potted. A variety of means for distributing such materials are available. Where plural components are involved, such systems typically include pumping mechanisms for pumping and metering separate materials in a prescribed ratio to a mixing device that thoroughly mixes these materials together. The mixed composition then flows out of a dispensing nozzle directly to the surface or point of application where the composition is desired.

When a curable composition is desired, two or more suitable materials are mixed to interact with each other to create a flowable, curable composition which will set or harden to a non-flowable state. The time required for a curable composition to harden is referred to as the "cure" time and often is a short period of time. Such resulting curable compositions have been used, for instance, as adhesives, sealants and potting materials in a wide variety of industrial applications and for the creation of useful objects.

Production environments can impose limitations on how a dispensing device should operate. For example, in a production environment, it is desirable for the curable composition to cure as rapidly as possible so that subsequent production operations can be performed on the production item without having to wait a significant time for curing to occur.

Further, production requirements often include the need to dispense a precise amount of a properly constituted composition. A deviation in the actual ratio of the constituent materials dispensed may alter the strength, viscosity, cure time and/or other properties and attributes of the composition. Thus, a dispensing system should dispense the desired ratio and quantity of constituent materials as accurately as possible. In many cases, the desired ratio is expressed as a function of the weight or mass of two constituent components. Nonetheless, the two constituent components are generally supplied to the mixer by volumetric metering pumps which control the volumetric ratio of the two components, rather than their weights or masses. The volumetric ratio fails to account for any changes in density and changes in mass that may occur when the components are subjected to temperature or pressure change.

Also, production items often move along a production line at a set speed. Therefore, the flow rate of the dispensed composition should be kept or maintained as constant as possible so that the time required to dispense the proper amount of composition onto or into the production item remains constant.

An assembly line operation may further require that the composition be dispensed intermittently because the composition is applied to production items that are separated spatially and temporally. Dispensing compositions intermittently may cause a loss of flow control and/or ratio control. During the first few seconds of dispensing a composition, a transient imbalance phenomenon may arise from the elasticity of materials in the dispensing system and/or changing pressures caused by cycling the dispenser. When pressure changes, the volume of stored material between the mixer and the pump changes. In other words, changes in pressure may introduce an error into the weight or mass ratio of the constituent components because a higher pressure results in a component taking less volume than the component would otherwise take, or in an expansion or shrinkage of the hoses, fittings and tubes. The loss of control may result in inaccurately dispensed quantities or ratio of materials. This loss of flow control can occur separately or in addition to the loss of ratio control. A loss of ratio control occurs when the transient imbalance phenomenon causes the dispensing system to dispense too much or too little of one constituent material, thereby resulting in an improperly constituted end product. In other words, even if the ratio control is not lost during the early stage of dispensing a composition, the flow control may be lost. Therefore, it is desirous to control both the ratio of constituent materials and the flow rate of dispensing of the resulting composition.

Dispensing machines may be used to create various types of compositions. A dispensing machine may be required to dispense two or more constituent materials to form a first composition and then switch to dispense either the same constituent materials in a different ratio or other constituent materials to form a second composition. Thus, it is desirable for a dispensing machine to change what materials are dispensed, the quantities of materials dispensed and/or the ratio of constituent materials while maintaining the ability to control accurately the quantity, ratio, flow rate and other dispensing criteria. Current dispensing systems fail to satisfy these needs and require users to shut down the dispensing machine and go through a lengthy calibration cycle in order to adjust the machine to the viscosity and/or other properties of the constituent materials.

Some dispensing systems include vats capable of holding large amounts of a constituent material. Motor-driven agitators are placed inside the vat to maintain the material homogeneity. One system is illustrated in U.S. Pat. No. 5,857,589 the disclosure of which is incorporated herein by reference. This system employs progressive cavity pumps and provides a system upon which the present disclosure is based.

SUMMARY OF THE INVENTION

The present invention is directed to dispensing systems employing progressive cavity pumps and controlled motor operation.

In a first separate aspect of the present invention, a dispensing system includes a valved nozzle to dispense material from a progressive cavity pump. The nozzle does not directly control the pump. Rather, a pressure sensor senses flow pressure in the system. This pressure is impacted upon by operation of the remote nozzle. A controller responds to pressure build up or decay and controls the pump accordingly.

In a second separate aspect of the present invention, the first separate aspect is further contemplated to define preselected pressures for actuation of the controller. Other attendant features are contemplated in this context. Compressed air may be supplied to the nozzle for the system to act as a paint sprayer, for example. The device might include multiple progressive cavity pumps for the mixing of separate flowable materials. With multiple progressive cavity pumps, the pumps preferably operate together to dispense multiple flowable materials and run at preselected proportional speeds relative to one another to create the proper mix. The system may be configured with one or more drum rams. The progressive cavity pumps can be mounted at the drum rams to reduce suction head requirements and to avoid difficulties with portable hoses and the like.

In a third separate aspect of the present invention, a method for spraying is contemplated which includes a repeated sampling of pressure in the system. A nozzle is opened and closed as material is needed without direct feedback from the dispensing value or nozzle. Pressure in the flow system is monitored and the progressive cavity pumps are driven responsive to the state of the pressure. When the method is also applied to accurate mixing, the motors are controlled simultaneously and provide preselected proportional pump speeds for mixture control.

In a fourth separate aspect of the present invention, a method for maintaining a stable set of operating conditions in a progressive cavity pump with the outlet closed includes periodically rotating the progressive cavity pump first in one direction and then in the other through a partial turn. The second rotation may also be varied from that of the associated first rotation as a function of pressure change. This may be done incrementally based on the pressure response occurring in the prior complete cycle or on direct pressure feedback.

In a fifth separate aspect of the present invention, the fourth aspect further includes the monitoring of system integrity by measuring pump absolute radial position after each cycle, continued advancing pump position being indicative of a leak in the system.

In a sixth separate aspect of the present invention, a high flow rate dispensing system using progressive cavity pumps includes a releasably coupled manifold to the pump supply lines. The manifold includes one passage extending into a discharge concentrically within the other passage. A mixer further combines the two flows. Valves may be employed to accommodate large flow rates and complete shut off.

In a seventh separate aspect of the present invention, a dispensing system for charging a mold employs progressive cavity pumps, a mixer and a conduit in pressure flow communication with the mold. A pressure sensor provides input to a controller controlling motors associated with the progressive cavity pumps, respectively. The pumping is controlled based on pressure of the flow to the mold and the change in pressure as a function of time as well. Accurate pressure control can be maintained through use of preselected pressure rates to keep weak molds from rupturing and yet allow charging in a minimum amount of time.

In an eighth separate aspect of the present invention, a method for pressure charging a mold includes driving progressive cavity pumps while repeatedly sampling pressure of the mixed pump material at the mold. When pressure reaches or exceeds a pre-selected upper pressure limit, the pumps are turned off. When the pressure reaches or falls below a preselected lower pressure limit, the pumps are reenergized. In addition, the driving speeds of the pumps are reduced when the rate of pressure increase at the mold during a pumping sequence exceeds a preselected amount.

In a ninth separate aspect of the present invention, a timer cooperates with a signal generator in a pumping system to provide a warning when the material in the system is approaching set up such that it cannot be driven through the system. Where a curable composition is being pumped and mixed, it will set or harden in a nonflowable state. Avoidance of this condition within the dispensing equipment is advantageous.

In a tenth separate aspect of the present invention, one or more progressive cavity pumps are controlled to run at constant pressure using a function of differential pressure between a preset target pressure and actual pressure to control pump speed. The system may use a PID loop.

In an eleventh separate aspect of the present invention, one or more progressive cavity pumps are controlled to provide virtual stall operation. A drive torque relationship with pressure is determined for specific speeds. When the torque approaches or exceeds a pre-established value for a specific speed, indicative of reaching a preset pressure limit, torque is limited.

In a twelfth separate aspect of the present invention, various combinations of the foregoing aspects are contemplated to provide system advantage.

Accordingly, it is an object of the present invention to provide improved systems and methods for accurately dispensing flowable material. Other and further objects and advantages will appear hereinafter.

BRIEF DESCRIPTION OF THE DRAWINGS

FIG. 14 is a cutaway view of a partial pump stator assembly having a single helix rotor within the double helix bore.

FIG. 19 is a diagram showing how FIGS. 20–23 connect to create a software flowchart for controlling aspects of the dispensing system.

FIG. 33 is a flow chart of a calibration routine.

FIG. 34 is a flow chart of a virtual stall system.

DESCRIPTION OF THE PREFERRED EMBODIMENT

Figure 1:
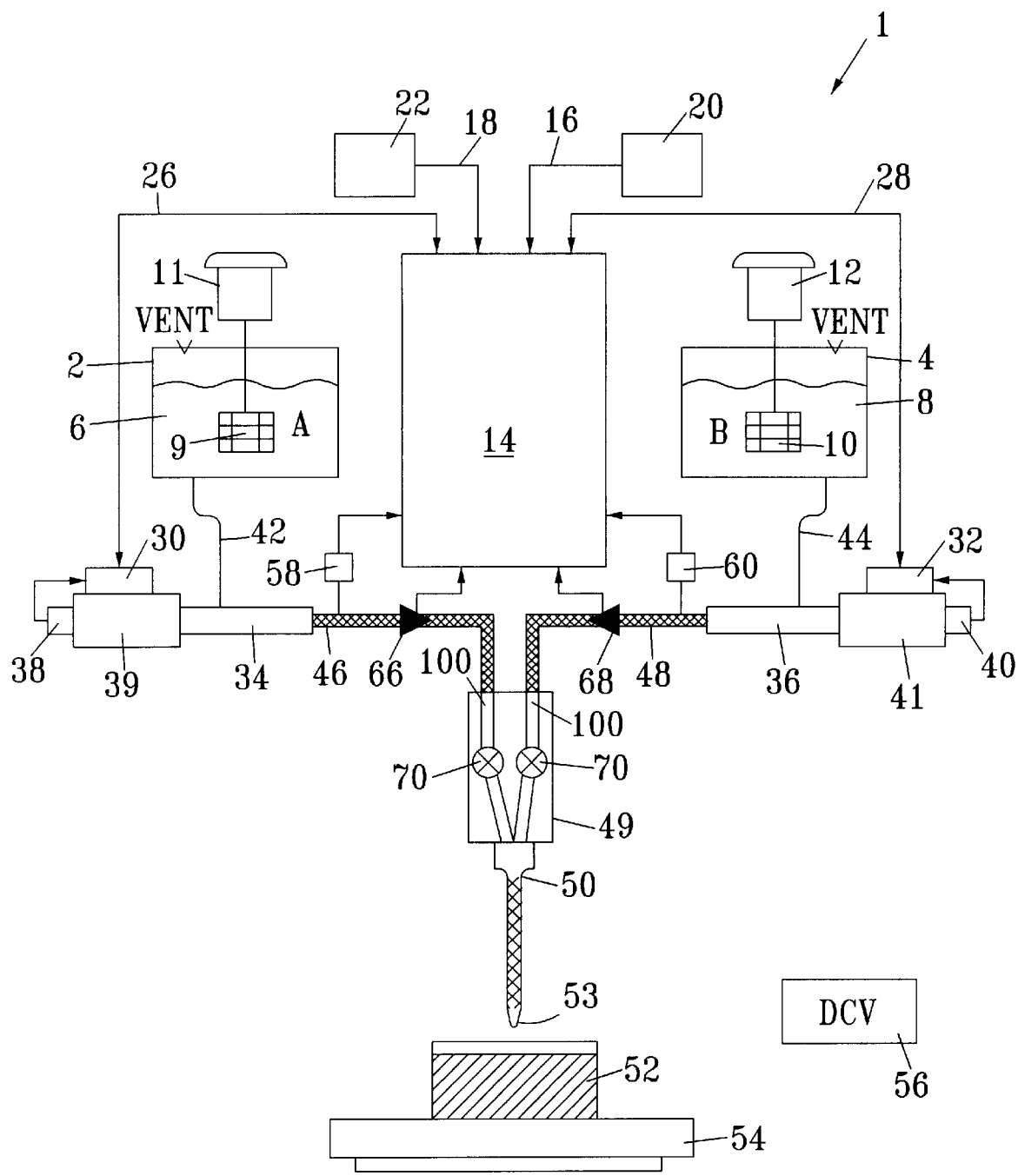
FIG. 1 is a block diagram of a preferred embodiment of a dispensing system which dispenses a single or plural component fluid.

FIG. 1 illustrates a block diagram of a dispensing system 1 which dispenses a single or plural component fluid. In FIG. 1, the dispensing system 1 has a plurality of vats 2, 4, each of which holds a fluid 6, 8 that is a constituent material of the desired final product. Agitators 9, 10 stir the fluids 6, 8 in order to maintain the fluids as homogeneously as possible. The dispensing system 1 has a master control unit 14 which may be a CPU, microprocessor, microcontroller, arithmetic logic unit, ASIC, field programmable gate array, or other logic control circuit. The master control unit 14 receives data and commands via data interconnects 16, 18 from a user input device 20 and/or a programming input device 22. The user input device 20 may be a keypad, buttons, switches, barcode reader, or other input device.

Depending on the input, the master control unit 14 controls various aspects of the dispensing system 1. For example, the master control unit 14 has lines 26, 28 for transmitting commands and receiving data from pump controllers 30, 32 which in turn direct and manage pumps 34, 36. The control unit 14 calculates desired pump parameters, such as acceleration, speed and duration, based on data entered through aforementioned user input devices and from data resident in the software and hardware of the control unit.

Primary items of information stored in the resident software are the dispense volume of each pump rotation, and the ratio between motor rotation and pump rotation. The software then calculates the number of motor rotations to deliver the desired quantity of material, including velocity or rotational speed. If one revolution of the pump outputs a known volume of a fluid, the control unit 14 calculates the tick count to control the number of revolutions and partial revolutions the pump makes and thus, direct the quantity of the fluid to be dispensed. The desired pump parameters are then downloaded to the pump controllers 30, 32, via the data lines 26, 28 and stored.

A signal to begin a cycle is sent simultaneously to each pump controller 30, 32 by the control unit 14, both pumps 34, 36 activate under their respective programs. The motor controllers 30, 32 then count the ticks received from absolute position encoders 38, 40 over time to manage the rotational speed or acceleration of the pumps 34, 36. The absolute position encoders 38, 40 are coupled mechanically to the shafts of the motors 39, 41 and may operate optically, mechanically, electrically or magnetically. The encoders 38, 40 count tick marks to detect the position of the shafts as they rotate. The encoders 38, 40 send pulses (i.e., a number of ticks over time) representing the shaft position information to the motor controllers 30, 32. As later described in FIG. 17, the pulses enter a control circuit 190 (within the motor controllers) and are used by the control circuit 190 to control power drivers 200 and the motors 39, 41. Thus, the pulses from the encoders are used by the motor controllers to adjust or fine tune the operation of the motors 39, 41. The motor controllers 30, 32 may send status and other information including encoder information to the master control unit 14. Thus, the motors 39, 41 and in turn the pumps 34, 36 are controlled by a pump control system including the master control unit 14, the motor controllers 30, 32 and the encoders 38, 40.

If a revolution of the pump outputs a known volume of a fluid, the pump control system, either the master control unit 14 or the motor controller depending on which device is to have feedback control in a particular design, can use the encoder tick measurement of the number of revolutions and partial revolutions made by the pump and thus, calculate the expected volume of the fluid dispensed. The master control unit 14 may count the ticks from the encoders 38, 40 over time to determine the rotational speed or acceleration of the pumps 34, 36. Thus, the pump control system, including the encoders 38, 40, measure pump displacement and rate to act as pump movement sensors.

The action of the pumps 34, 36 draws fluids 6, 8 into the pumps through vat fluid lines 42, 44. The fluids 6, 8 pass into the pump fluid lines 46, 48 and into a dispense head 49 having a separate chamber 51 for each pump fluid line 46, 48. From the dispense head 49, the fluids pass into a static mixer tube 50. The static mixer tube 50 has internal projections that mix the fluids 6, 8 together and dispense an end product 52 through the output nozzle 53 of the static mixer tube 50. The end product 52 may be dispensed onto a scale 54 which weighs the end product. The dispensing system 1 receives DC power from a DC power supply 56.

Thus, the dispensing system as shown in FIG. 1 is a two-channel system, where each channel handles the dispensing of one fluid. The first channel (channel A) includes the vat 2, vat fluid line 42, pump 34, pump controller 30, encoder 38, pump fluid line 46 and dispense head 49. The second channel (channel B) comprises the vat 4, vat fluid line 44, pump 36, pump controller 32, encoder 40, pump fluid line 48 and dispense head 49. The dispensing system may also be modified to include additional channels and include additional vats, agitators, pumps, fluid lines and other components as desired to dispense three or more component mixtures or dispense multiple mixtures through separate dispense heads at the same or remote locations.

Pressure transducers 58, 60 send feedback information about the pressure in the pump fluid lines 46, 48 to the master control unit 14 so that the master control unit 14 can monitor the pressure in the pump fluid lines 46, 48 from the output of the pumps 34, 36 to the dispense head 49. The ability to maintain a constant pressure from the output of each pump 34, 36 to the dispense head 49 helps assure that the fluid is compressed uniformly and constantly so that an accurate amount of fluid is dispensed. Additionally, if there is a blockage or malfunction, the pressure transducer will signal a preset overpressure situation, and the system will shut down. Similarly, flow meters 66, 68 measure the flow rates within the pump fluid lines 46, 48 and transmit flow rate information to the master control unit 14, thereby allowing the master control unit 14 to monitor the fluid flow rates. Should the flow rates differ from calibration data, the system can be shut down and an error reported.

The dispense system can also use information from the pump controllers 30, 32 and the flow meters 66, 68 and other feedback sensors to check the pump and plumbing for leaks and trapped air. Appropriate error messages may be issued to the user to insure optimum performance. The dispense system may change the delivered material composition, from shot-to-shot or during the time the material is being dispensed, in order, for example, to adjust material pre-cure and post cure characteristics such as the viscosity, color and thixotropic factors of the material.

The dispense head 49 has positive cutoff valves 70 which are symbolically shown in FIG. 1. The positive cutoff valves 70 are controlled by the master control unit 14 and serve to cut off the flow of fluids in the dispense head 49 whenever appropriate (i.e., when the dispense cycle is completed). The control lines between the master control unit 14 and the positive cutoff valves 70 are not shown in FIG. 1.

The agitators 9, 10 in the vats 2, 4 are driven by agitator motors 11, 12. The agitators 9, 10 are illustrated as stir paddles but may be any type of agitator well known in the art. The agitators 9, 10 run at a constant desired speed. However, as the level of the fluid in a vat 2, 4 falls, less current is required to drive the agitator at the same speed. The master control unit 14 can detect the reduced current flow and determine the amount of fluid remaining in the vat. Alternately, the system can be made to maintain a constant current instead of constant motor speed. An additional encoder and motor controller similar to those previously described are coupled to each agitator motor so that the motor controller (and master control unit 14) can receive rotational position information from the agitator motors. Accordingly, the master control unit 14 can determine the rotational speed of each agitator to determine the level of fluid remaining in the vat. As the fluid level in the vat falls and as the current flow to the agitator motor is kept constant, the rotational speed of the agitator motor increases. The master control unit 14 can measure the rotational speed of the agitator motor to determine the level of fluid remaining in the vat. The master control unit 14 can also decrease the current to the agitator motor when the master control unit 14 detects that the motor speed has increased. Each vat 2, 4 may have a float connected to a normally closed switch. When the fluid level falls below a certain level, the float falls and triggers the switch to open.

The dispensing system of FIG. 1 operates as follows:

1. The user calibrates the dispensing system (as described later) and the dispensing system calculates how much the pump motors must rotate in order to dispense a unit weight of a fluid or mixture.
2. The user enters program mode to set up shot parameters.
3. In response, the master control unit 14 queries the user for various parameters of the dispense cycle.
4. The user inputs the desired ratio of component fluids, the shot size of the end product, and either the flow rate or the time duration of the dispense cycle.
5. The master control unit 14 determines the proper pump parameters in order to feed constituent materials at the desired rate and downloads instructions to the pump controllers 30, 32.
6. The user initiates a dispense cycle by depressing a foot pedal, button or switch. The system can also be initiated by a signal from a pressure transducer to dispense more fluid.
7. The master control unit 14 starts the dispense cycle by opening the positive cutoff valves 70 in the dispense head 49 and by starting the pumps 34, 36.
8. The pump controllers 30, 32, flow meters 66, 68 and pressure transducers 58, 60 feed back information about the rotational speed of the pumps, flow rates and pressures to the master control unit 14. The pump controllers 30, 32 also self monitor for speed and torque accuracy and feed errors back to the master control unit 14. The master control unit 14 uses this information to monitor the pump for correct rotational speed, flow rates and pressures.
9. The pressure transducers 58, 60 check for blockages in the pump fluid lines 46, 48 and shut down the dispensing system to prevent damage to the system if the detected pressure exceeds a pressure limit set point (i.e., an overpressure condition).
10. The pumps 34, 36 and the positive cutoff valves 70 maintain the proper pressure in pump fluid lines 46, 48 by functioning as positive cutoffs between shot cycles. When the dispense cycle ends, the master control unit 14 closes the positive cutoff valves 70 and stops pumps 34, 36.
11. The master control unit 14 analyzes received information and determines whether a dispense cycle was successfully completed.
12. Should there be a need to modify the pump function to insure correct dispense characteristics, the master control unit 14 sends new commands to the pump controllers 30, 32.
13. Steps 6–12 are repeated as needed for different quantities, ratios and durations.

Figure 2:
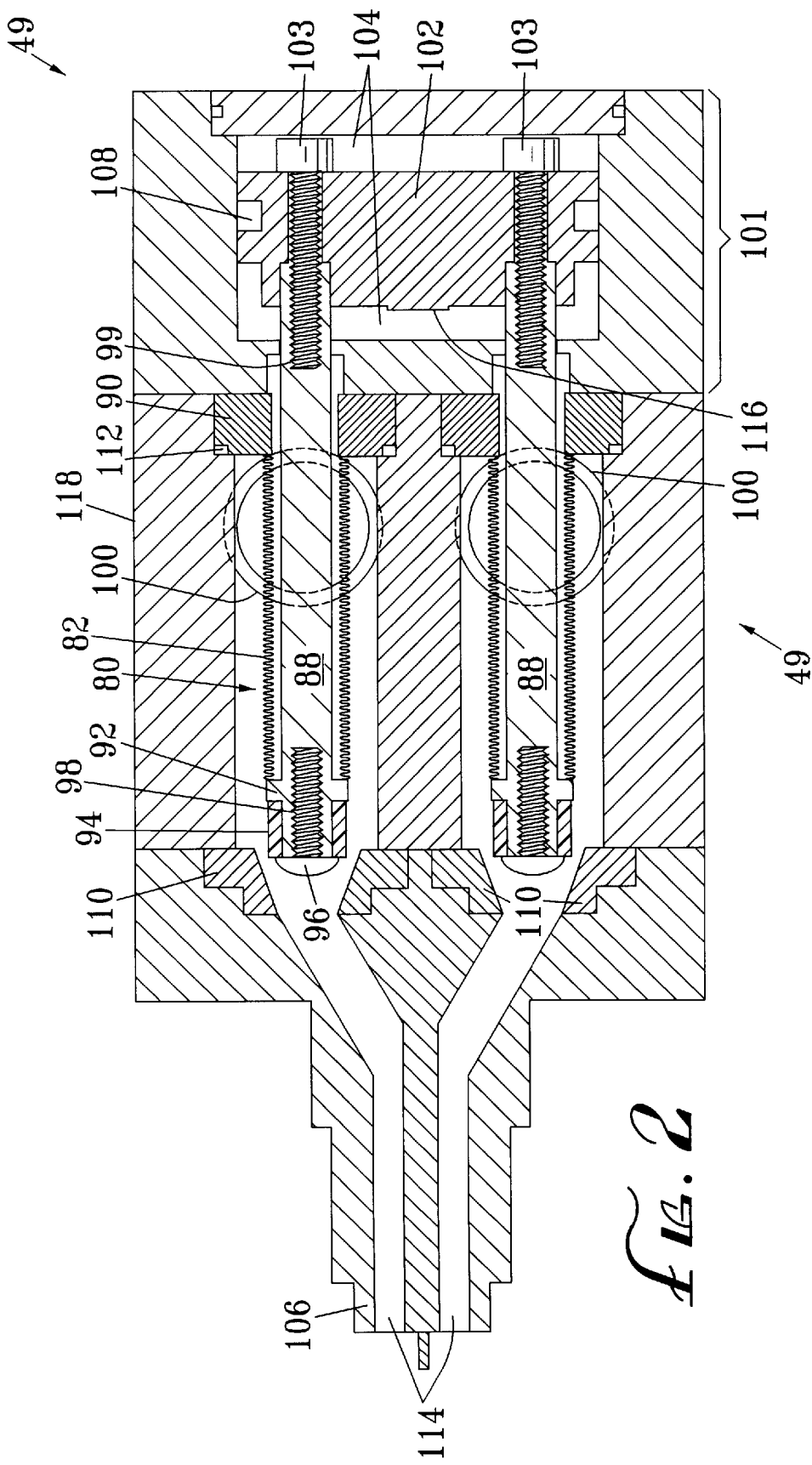
FIG. 2 is a cross-sectional diagram of a dispense head in the opened position.
Figure 4:
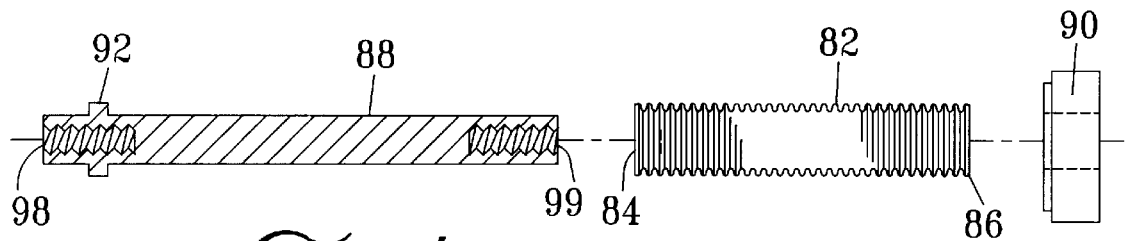
FIG. 4 is an exploded cross-sectional view of the bellows assembly.
Figure 5:
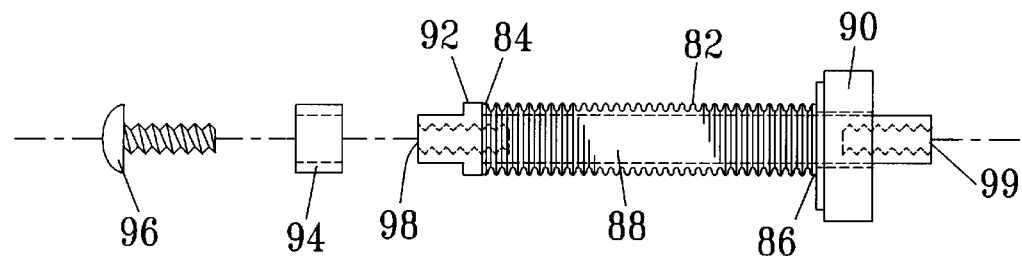
FIG. 5 is a partially exploded cross-sectional view of the bellows assembly.
Figure 7:
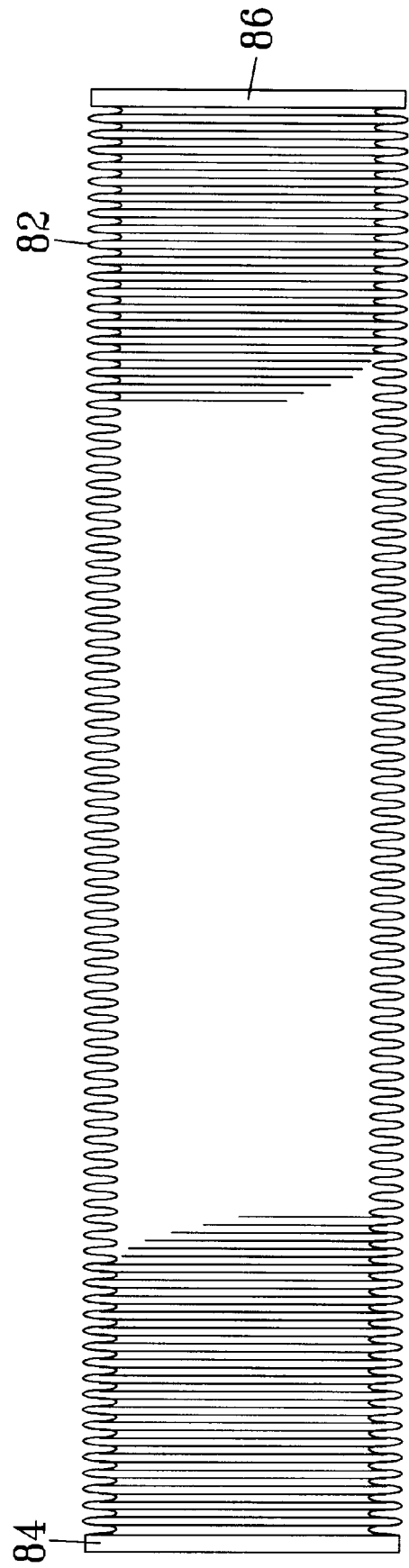
FIG. 7 is a cross-sectional view of the bellows.

FIG. 2 is a cross-sectional diagram of a dispense head 49. The dispense head 49 is a combination manifold/on-off valve that controls the flow of fluids. The dispense head 49 includes a bellows assembly 80. FIG. 4 illustrates an exploded cross-sectional view of the bellows assembly 80 and FIG. 5 depicts a cross-sectional view of a partially constructed bellows assembly 80. Turning to FIGS. 4 and 5, the bellows assembly 80 includes a bellows 82. The bellows 82 is a compressible corrugated metal alloy sleeve that is shown in greater detail in FIG. 7. As shown in FIG. 7, the bellows 82 has two ends 84, 86. Returning to FIGS. 4 and 5, a valve rod 88 is inserted into a center hole of the bellows 82. The bellows 82 slides freely along the length of the valve rod 88. The valve rod 88 is also inserted into an aperture of a rod seal ring 90. The rod seal ring 90 is not affixed to the valve rod 88 and is also free to slide back and forth along the length of the valve rod 88.

Figure 6:
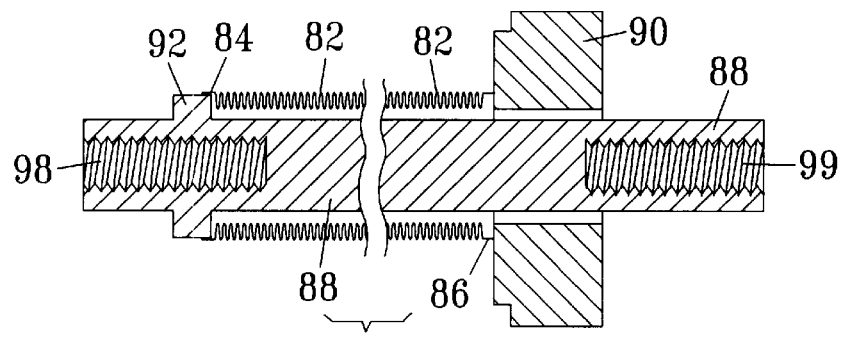
FIG. 6 is a cross-sectional view of the bellows assembly as mounted to the valve rod and rod end.

FIG. 6 is a cross-sectional view of the bellows assembly 80 and shows how the bellows assembly 80 is affixed to the valve rod 88 and the rod seal ring 90. One end 84 of the bellows 82 is hermetically sealed to the raised lip 92 of the valve rod 88 by welding, soldering, brazening or other means. The other end 86 of the bellows 82 is similarly hermetically sealed by welding, soldering, brazening or other means to the rod seal ring 90. Thus, as the valve rod 88 extends and retracts from the rod seal ring 90, the valve rod 88 alternately compresses and expands the bellows 82.

A seat/rod seal 94 slides over and around an end of the valve rod 88 and abuts the raised lip 92 of the valve rod 88. A retaining screw 96 enters the opening of the seat/rod seal 94 and screws into mating threads 98 of the valve rod 88. The retaining screw 96 holds the seat/rod seal 94 in place.

Returning to FIG. 2, each bellows assembly 80 is shown as mounted in a separate chamber 51 within the dispense head 49. The dispense head 49 has two inlets 100. The inlets 100 receive fluids 6, 8 from the pump fluid lines 46, 48, and go perpendicularly into the illustration of FIG. 2.

A pneumatic valve actuator includes an air cylinder 101 having a piston 102 which moves freely within the air cylinder 101. Screws 103 pass through passages in the free piston 102 and engage the mating screw threads 99 of the valve rods 88 to attach the valve rods 88 to the air cylinder 101. Each air chamber 104 of the air cylinder 101 has at least one air port (not shown) that allows air to be pumped into or out of the chamber. As shown in FIG. 2, the piston 102 is in its rightmost position (i.e., in a position furthest away from the valve nose 106). The piston 102 has an O-ring groove 108 for holding a dynamic O-ring which acts as an air seal between chambers of the air cylinder 101.

Figure 3:
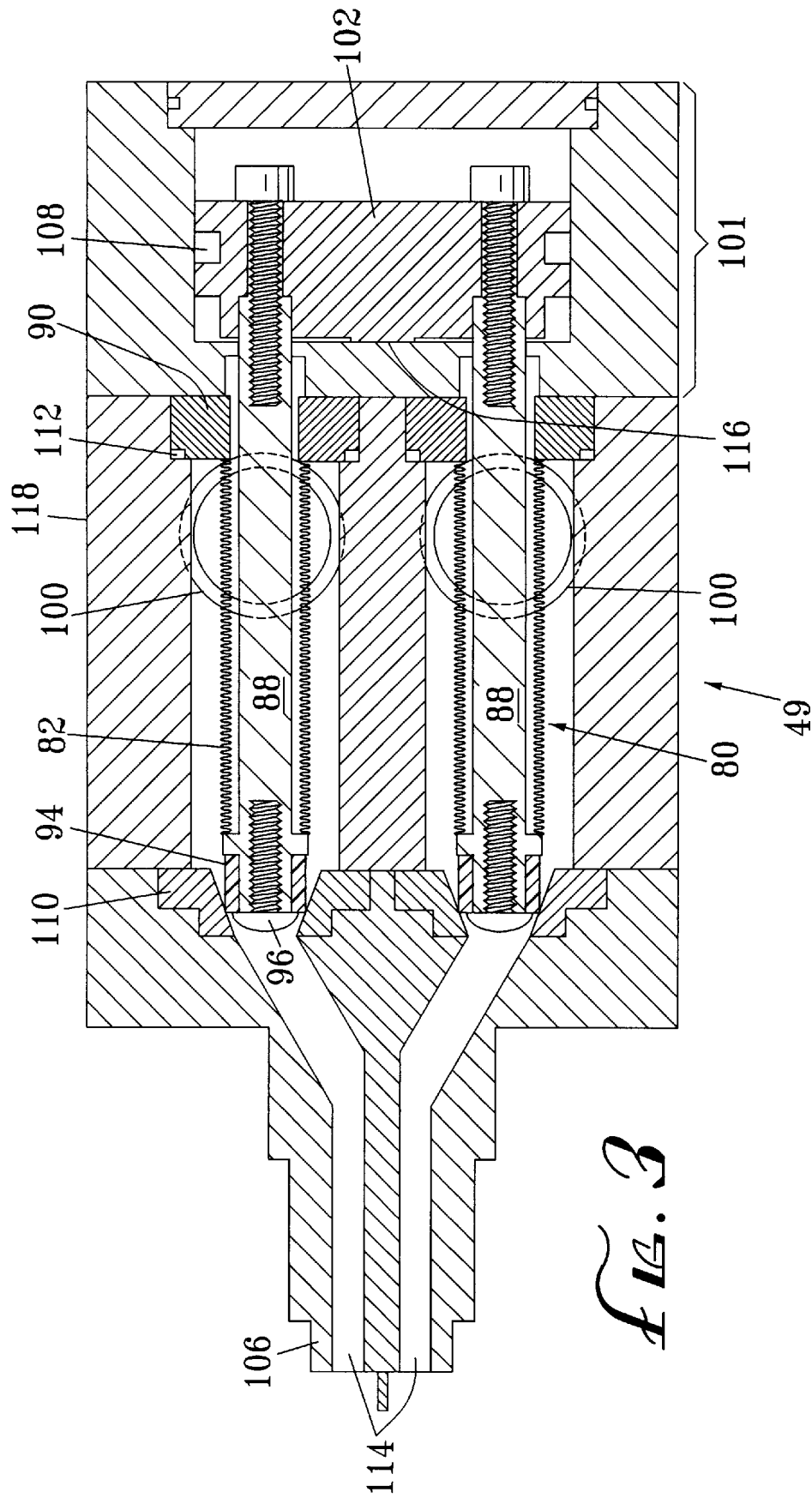
FIG. 3 is a cross-sectional diagram of a dispense head in the closed position.

When air is selectively pumped into the chambers 104 such that the air pressure in the rightmost chamber sufficiently exceeds the air pressure in the leftmost chamber, the piston 102 travels leftward towards the valve nose 106. This leftward motion of the piston 102 pushes the valve rod 88 leftward and expands the bellows 82. When the piston 102 extends the valve rods 88 leftward, the seat/rod seal 94 compresses into the tapered bore of the valve seat 110, thereby closing off the flow of fluids in the dispense head 49. The rod seal ring 90 is held in place within a cavity of the dispense head 49 and has an O-ring groove 112 for holding a static O-ring. The static O-ring acts as a fluid seal to prevent fluid in the dispense head 49 from leaking around the rod seal ring 90. The resulting closed position configuration is shown in FIG. 3. Instead of a pneumatic actuator such as the air cylinder, the system may utilize an electronic actuator such as a solenoid to move the valve rods 88. The system may also use any other actuator well known in the art.

The bellows assembly 80 in FIG. 3 is in the closed position because there is no gap between the seat/rod seal 94 and the valve seat 110, thereby preventing fluid from flowing into the exit passages 114 and into the static mixer tube 50. A raised surface 116 on the piston 102 prevents the piston surface from completely engaging the inner surface of the air cylinder 101 when the piston 102 is in its leftmost position. The raised surface 116 maintains at least some minimal air gap between part of the piston surface and the air cylinder surface so that the piston surface does not "stick" to the air cylinder surface.

To open the bellows assembly 80, the piston 102 is moved away from the valve nose 106 so that the valve rod 88 moves relative to the rod seal ring 90. This relative movement of the valve rod 88 to the rod seal ring 90 compresses the bellows 82. The resulting configuration of the bellows assembly 80 is the open position shown in FIG. 2 where the gap between the seat/rod seal 94 and the valve seat 110 permits fluid to pass into the exit passages 114. Hence, the fluid coming from the inlets 100 may enter the dispense head 49 and flow out of the exit passages 114 of the dispense head 49. The opening and closing of the bellows assembly 80 act as a positive cutoff valve 70.

The valve seat 110 may be made of stainless steel or other suitable material. The seat/rod seal 94 may be formed of PTFE or other suitable material that is deformable and yet highly impervious to chemicals. The valve body 118, valve nose 106, piston 102 and air cylinder 101 are made of aluminum or other suitable material.

The dispense head 49 has no dynamic sealing surfaces. The primary sealing mechanism is the bellows assembly 80. A significant advantage of such a dispense head is that none of the components which come in contact with the fluids being dispensed also come into contact with any moving or dynamic sealing surfaces. Potential contamination may arise from moisture in the air which can cause the fluids to crystallize, or from contamination in the fluids themselves. Therefore, the dispense head of FIG. 2 advantageously eliminates movement between any mechanical components of the dispense head 49 in the valve chamber and any fluid seal, thereby eliminating the possibility that a seal would be destroyed by the fluids or by abrasive contamination in the fluids.

Figure 8:
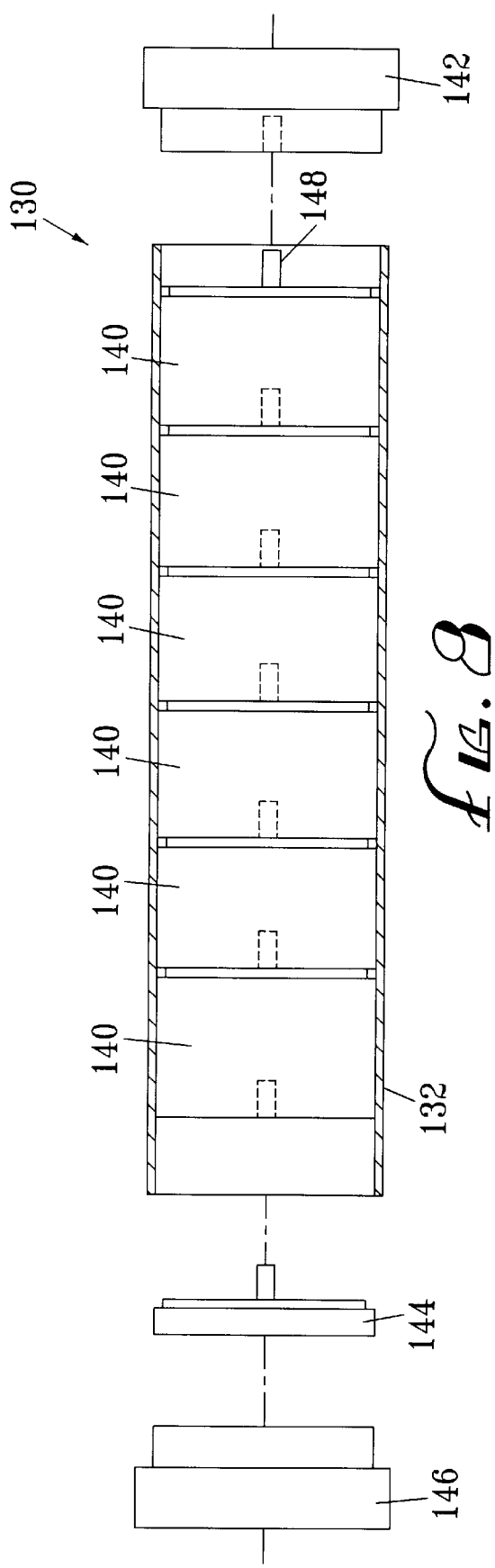
FIG. 8 is a cross-sectional diagram of a preferred embodiment of the pump stator assembly.

FIG. 8 is a diagram of the pump stator assembly 130 of the progressive cavity pumps 34, 36. The pump stator assembly 130 is essentially comprised of multiple interlocking pressure sections 140 that have been inserted into a metal hollow tube housing 132 with a locking end cap at both ends. A threaded front end cap 142 receives the last pressure section 140 at the front end of the stator assembly 130. A retainer 144 attaches to tube housing 132 and the last pressure section 140 at the rear end of the stator assembly 130. A threaded rear end cap 146 then attaches to the tube housing 132.

Figure 13:
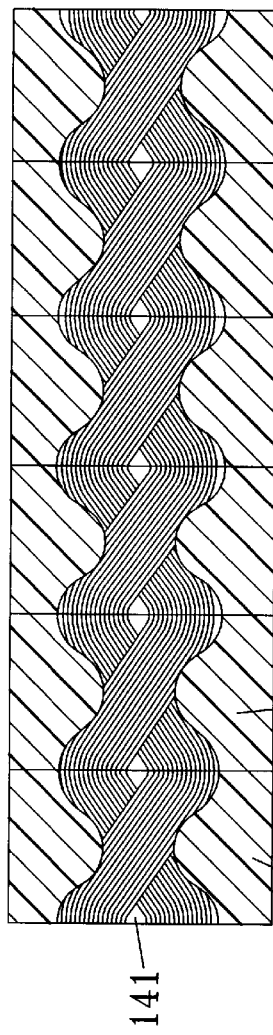
FIG. 13 is a cross-sectional view of the pump stator assembly of FIG. 8 and illustrates the flow pattern of fluids passing through the pump stator assembly.
Figure 9:
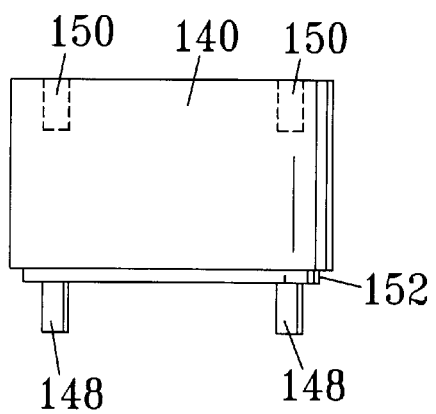
FIG. 9 is a side view of a pressure section of the pump stator assembly of FIG. 8.
Figure 10:
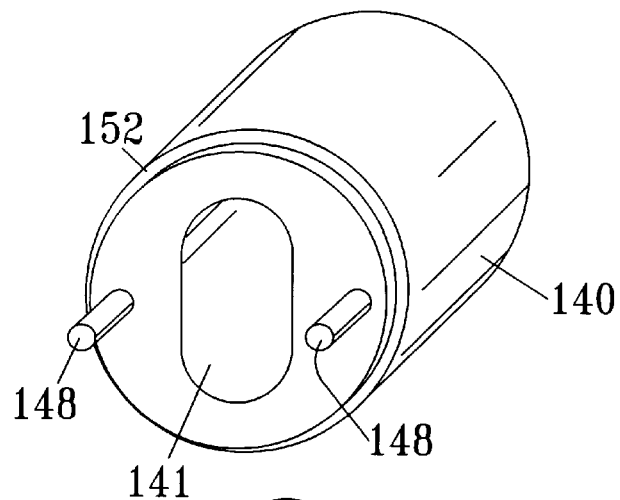
FIG. 10 is a perspective end view of a pressure section of FIG. 9.
Figure 11:
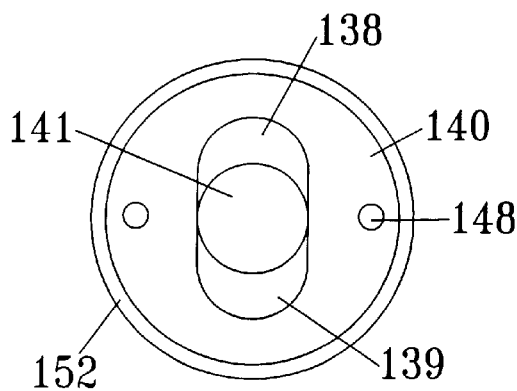
FIG. 11 is an end view of a pressure section of FIG. 10.
Figure 12:
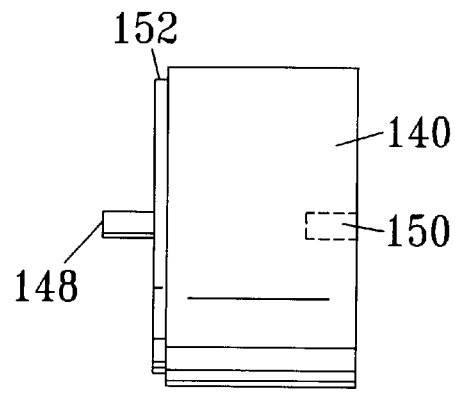
FIG. 12 is another side view of a pressure section of FIG. 9.

FIGS. 9–12 illustrate different views of a pressure section 140 of the pump stator assembly 130. FIG. 9 is a side view of the pressure section 140; FIG. 10 is a perspective end view of the pressure section 140; FIG. 11 is an end view of the pressure section 140 of FIG. 10; FIG. 12 is another side view of the pressure section 140; FIG. 13 is a cross-sectional view of the pump stator assembly of FIG. 8 and illustrates the resulting double helix flow pattern of fluids passing through the pump stator assembly.

Each pressure section 140 is made of PTFE or other suitably deformable, durable, yet highly chemically resistant and abrasion resistant material. Such materials may be filled with wear resistant material such as graphite, glass or molybdenum disulfide. Each pressure section 140 has a concentric 360 degree double helix bore 141 running through its center. A first helix thread 138 and a second helix thread 139 of the bore are shown in FIG. 13. The helix threads wind down the length of the bore 141, are opposed to each other by 180 degrees and cross each other every 180 degrees. Essentially, each pressure section 140 has one crossing of the double helix threads. To manufacture the double helix bore, a solid PTFE rod is provided, a circular bore is drilled through the rod, and two helix threads are carved out of the bore of the rod.

Each pressure section 140 has pins 148 which mate with holes 150 of an adjacent pressure section 140 to interlock the pressure sections together and to maintain the radial alignment between adjacent pressure sections. The pressure section 140 has an O-ring groove 152. An O-ring (not shown) made of PTFE or other suitably deformable yet durable material fits into the O-ring groove 152 between adjacent pressure sections to seal each pressure section. When the end caps 142, 146 are tightened to compress the pressure sections 140 together, the O-rings expand outward against the walls of the metal tube housing 132.

Figure 15:
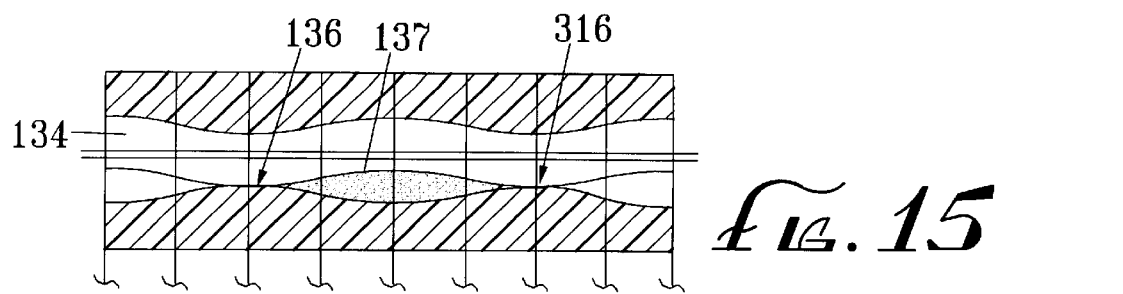
FIG. 15 is a cross-sectional view of a partial pump stator assembly and rotor.
Figure 16:
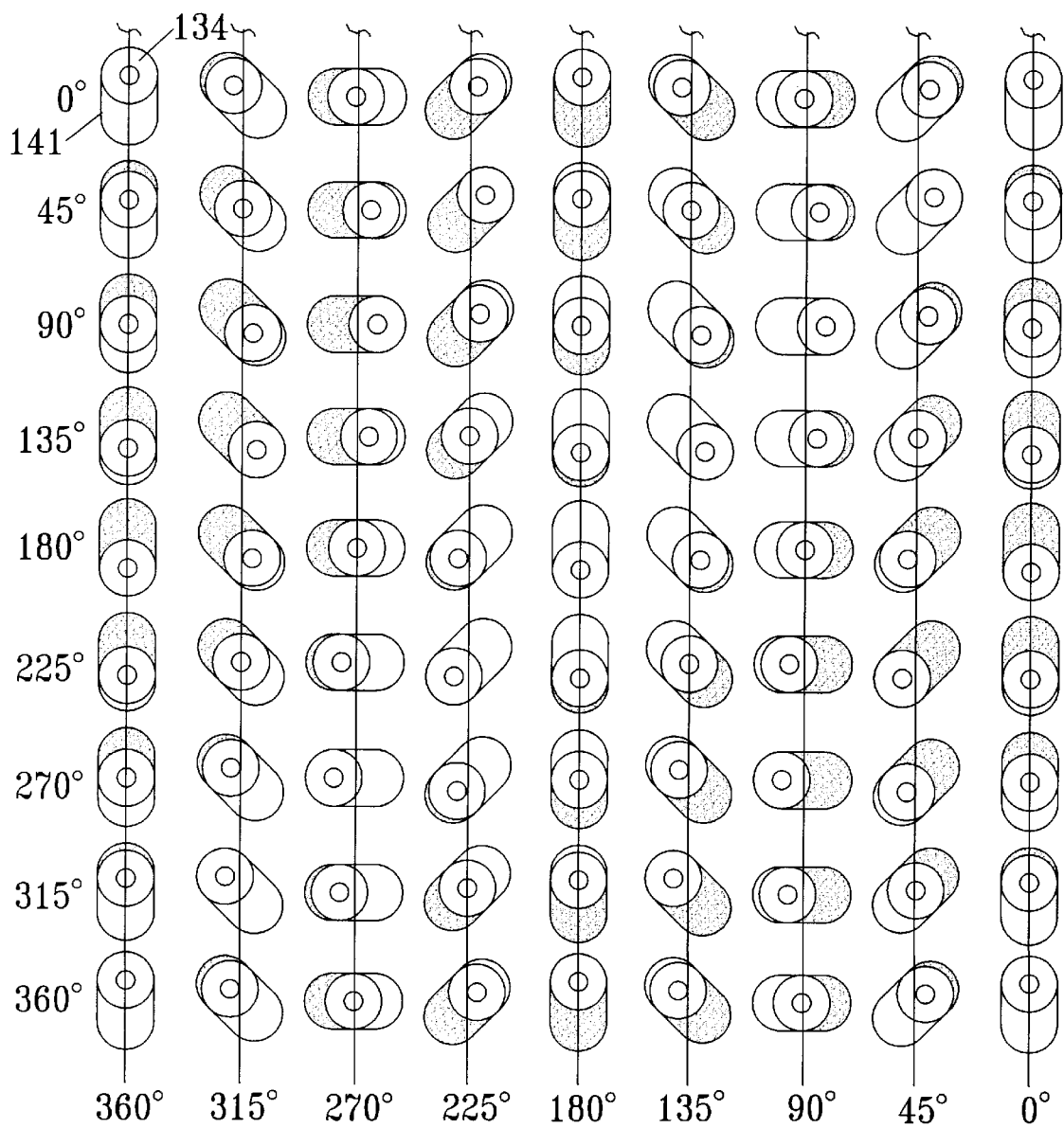
FIG. 16 is a diagram showing the position of the single helix rotor as the rotor rotates within the double helix bore of a pump stator assembly.

A rotor or screw 134 having a single helix thread is inserted through the double helix bore 141 of the interlocked pressure sections 140. The interaction of the single helix rotor 134 and the double helix bore 141 creates the pumping action. FIGS. 14–16 illustrate how the single helix rotor operates within the double helix bore of a pump stator assembly. FIG. 14 is a cutaway view of a partial pump stator assembly having a single helix rotor within the double helix bore.

Referring to FIG. 14, the single helix thread of the rotor 134 engages portions of the double helix threads 138, 139 to create sealing lines 136. Fluid may be carried between a pair of sealing lines 136. As the rotor 134 turns within the double helix bore 141, the sealing lines 136 move down the length of the bore, thereby transporting the fluid and creating a progressive cavity pump. The desired total number of turns in the double helix threads of the bore of the stator pump assembly 130 depends on the desired pump characteristics.

FIG. 15 is a cross-sectional view of a rotor in a partial pump stator assembly (where the lines through the pump stator assembly do not represent the pressure sections but are used to correlate FIG. 15 to FIG. 16). FIG. 15 illustrates the sealing lines 136 formed by the contacts between the rotor 134 and the double helix threads of the bore 141 as well as the cavity 137 formed between adjacent sealing lines. FIG. 16 is a diagram showing the position of the single helix rotor as the rotor rotates within the double helix bore of a pump stator assembly.

The bore 141 of the pressure sections 140 has an interference fit with the rotor 134. That is, although the maximum outer dimension of the rotor 134 exceeds the minimum inner dimension of the bore 141 of the pressure sections 140, the flexibility of the pressure sections 140 permits the rotor to fit within the bore 141. The interference fit creates a seal between the rotor 134 and the bore 141 by eliminating the gap between the rotor and the bore. Lack of a gap means that fluids are prevented from leaking back through the bore 141 of the pump. When fluid leaks back through the bore 141, the pump operates inefficiently and inaccurately. The interference fit also results in minimized slippage of the rotor 134 relative to the bore 141. Thus, the interference fit results in a positive displacement pump wherein every rotation of the pump outputs an accurate and known volume of fluid. Because the pump is a constant displacement pump, the pressure of the system rises or falls to a steady state depending on the viscosity and flow rate of the material being pumped, and the dynamic back pressure of the system through which the fluid is dispensed. As this pressure is different for each output requirement, it is imperative that the pressure be maintained between cycles to insure accurate shot-to-shot dispense reproducibility.

By contrast, as pressures change unexpectedly in prior art devices, the fluid is compressed differently which results in a non-constant amount of fluid being dispensed. This problem with non-constant pressures is prevalent in prior art systems because as the dispense rate changes, the pressure changes. For example, a rotor that moves within a smooth bore may suffer from leakage and pressure changes. In such a pump, if fluid is poured into the bore having the rotor, the fluid will flow down the thread of the rotor, down the bore and out of the pump. The sealing lines of the double helix pump help prevent fluid from "pouring" through the pump.

Notably, each pressure section 140 can maintain a constant pressure even when the rotor 134 is static. When the rotor 134 rotates, the fluid being dispensed is transported through the pump stator assembly 130 from one pressure section to the next. The resulting progressive cavity pump is able to maintain high pressure, is volumetrically accurate and has a pulseless output flow. The pump is able to maintain constant volume of the fluids being dispensed, thereby insuring the accuracy of the dispensing characteristics. The flexible nature of the interlocked pressure sections and the metal hollow tube housing 132 of the pump also help limit the tendency of the rotor 134 to nutate or twist during rotation of the rotor 134.

Figure 17:
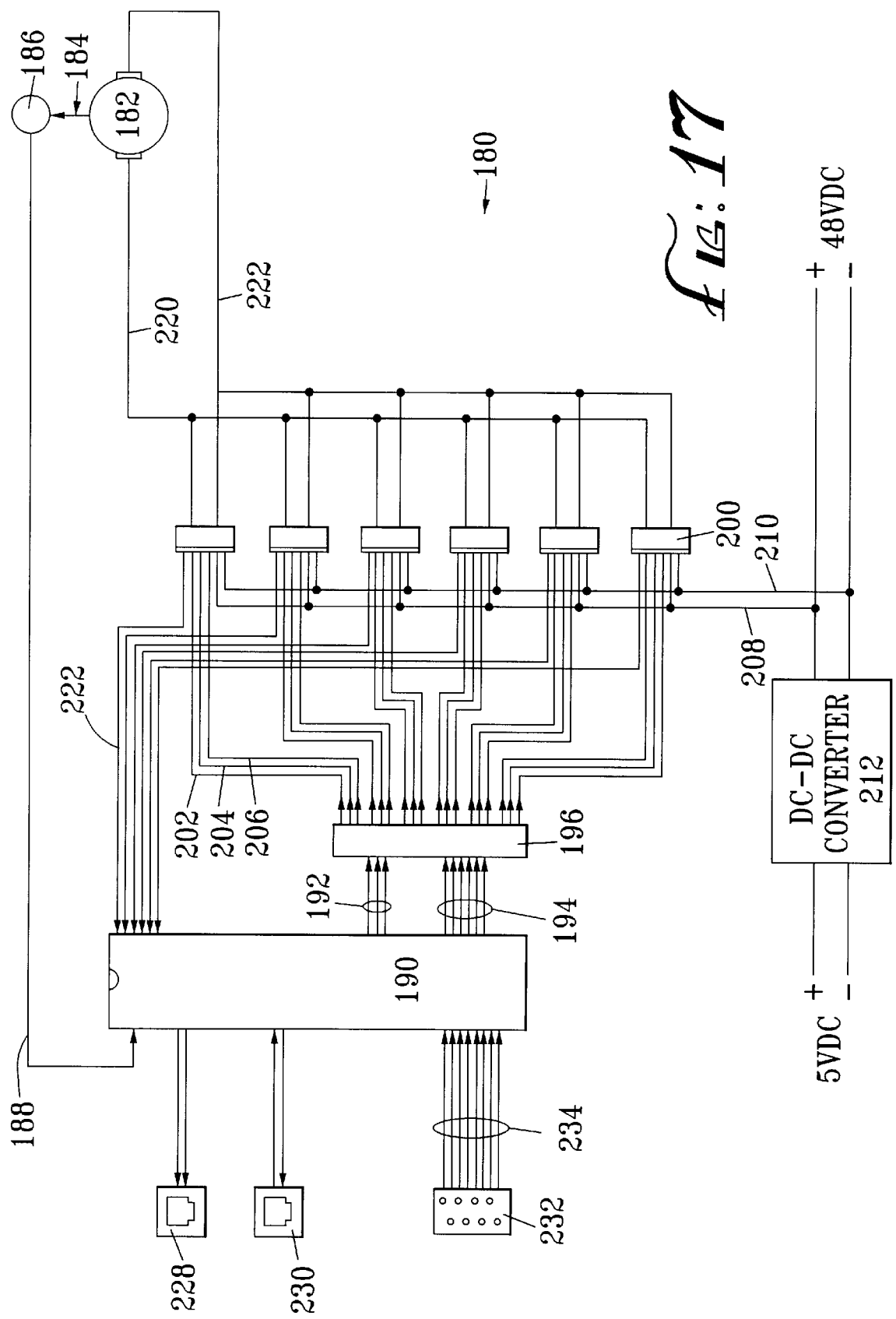
FIG. 17 is an electrical block diagram of a preferred embodiment of a motor controller.

FIG. 17 is an electrical block diagram of a preferred embodiment of the motor controller 180 of the present invention. The motor controller 180 may be used to drive any motor described herein. The motor 182 is a permanent magnet DC brush or brushless motor and in particular, a 48 volt ½ horsepower motor. The motor 182 is mechanically connected to an encoder 186. The encoder detects the absolute position of the motor shaft and sends this position information 188 to the control circuit 190. The control circuit 190 can use the position information to determine the rotational speed or acceleration of the motor. The control circuit 190 sends various control signals 192 and "ready" control signals 194 to a multiplexor 196. The ready signals 194 allow the control circuit 190 to turn off any specific power driver 200 if the power driver suffers a non-catastrophic failure. Signals from the multiplexor 196 pass to various power drivers 200. A DC-to-DC converter 212 converts a 48 volt power supply to 5 volts which runs various electronics in the system and also sends 48 volts to the power drivers 200. The power drivers 200 are semiconductor devices that use low level inputs (i.e., signals from the multiplexor 196) to control relatively high current level outputs (i.e., lines 220, 222) to control the motor 182.

Three of the input signals are the brake control signal 202, direction control signal 204 and the pulse width modulation (PWM) control signal 206. The brake control signal 202 causes the power drivers 200 to short the lines 220, 222 going to the motor 182 which uses back electromotive force (emf) to dynamically brake or stop the motor 182 as quickly as possible. The direction control signal 204 tells the power drivers 200 whether to reverse the direction of the motor 182. The pulse width modulation control signal 206 carries a train of pulses and the power drivers 200 count the number of pulses over time. As the number of pulses per unit time increases, the power drivers 200 output increasingly higher voltages up to a maximum of 48 volts to speed up the motor 182 accordingly. As the number of pulses per unit time falls, the power drivers 200 reduce the output voltage to slow down the motor 182.

The power drivers 200 have current feedback lines 224 that return current flow information to the control circuit 190. The control circuit 190 uses the current flow information to see how hard the motor 182 must work to maintain a given speed. This information can be used to derive the torque.

The control circuit 190 may receive information, analog or digital, from devices connected to the monitor port 228. For example, a temperature sensor may be connected to the monitor port 228 to provide temperature data to the control circuit 190. A RS232 control port 230 facilitates communication between the control circuit 190 and the master control unit 14 for motor information and commands. The RS232 control port 230 allows the system to monitor the motor controller 180 for such information as the desired motor speed, actual motor speed, desired number of total motor revolutions, actual number of total motor revolutions, and current flow to each of the power drivers 200. A DIP switch 232 may optionally be used to manually set the speed of the agitators which would otherwise be adjustable by the control circuit 190. The DIP switch settings are sent over lines 234 to the control circuit 190.

Thus, the dispense system has various communication abilities. The dispense system may be attached to an outside telephone line, allowing service personnel at a remote location to monitor the system's performance and diagnose any malfunctions. A bar code reader may be attached to the dispense system where the system uses the bar code reader to identify a part, automatically configures itself to dispense according to a known program, and displays an image of the part so the user can verify that the program is the correct program for the displayed part. The system also may monitor material utilization, store in memory the total material used, and communicate with a manufacturing network to provide material use information to an external computer system.

Figure 18:
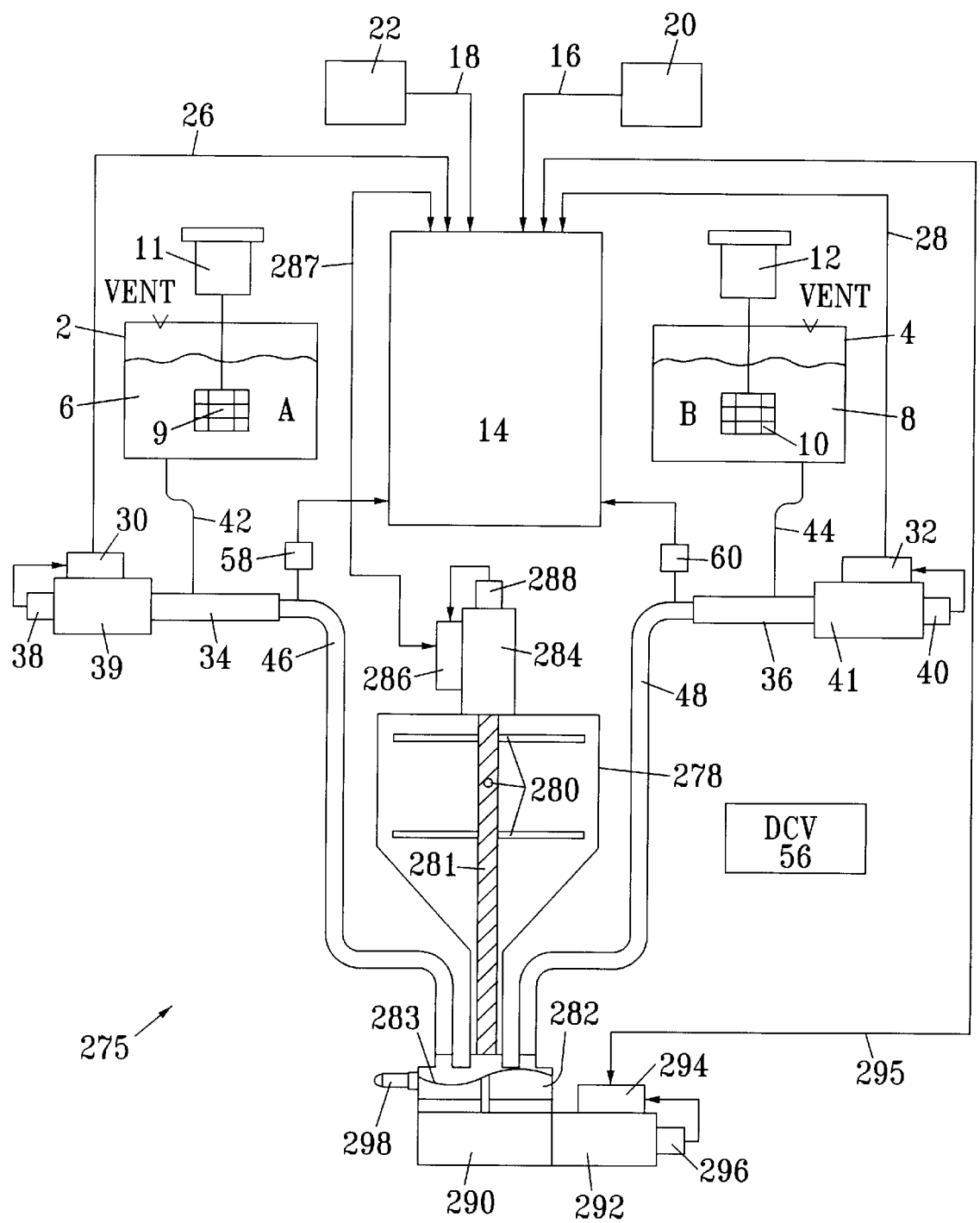
FIG. 18 is a block diagram of a preferred embodiment of a dispensing system which dispenses a powder and a single or plural component fluid.
Figure 20:
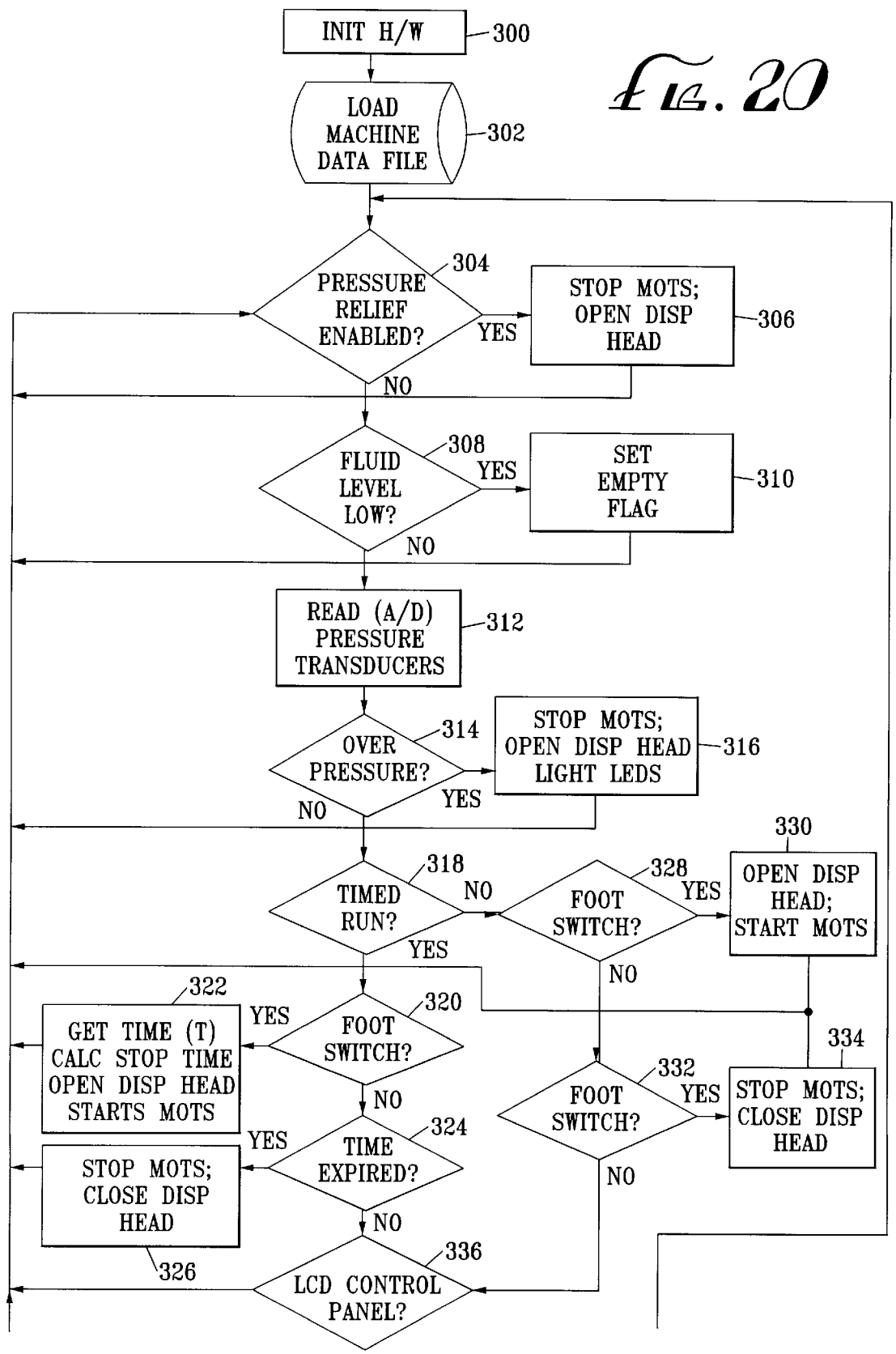
FIGS. 20–23 are software flowcharts for controlling aspects of the dispensing system.
Figure 21:
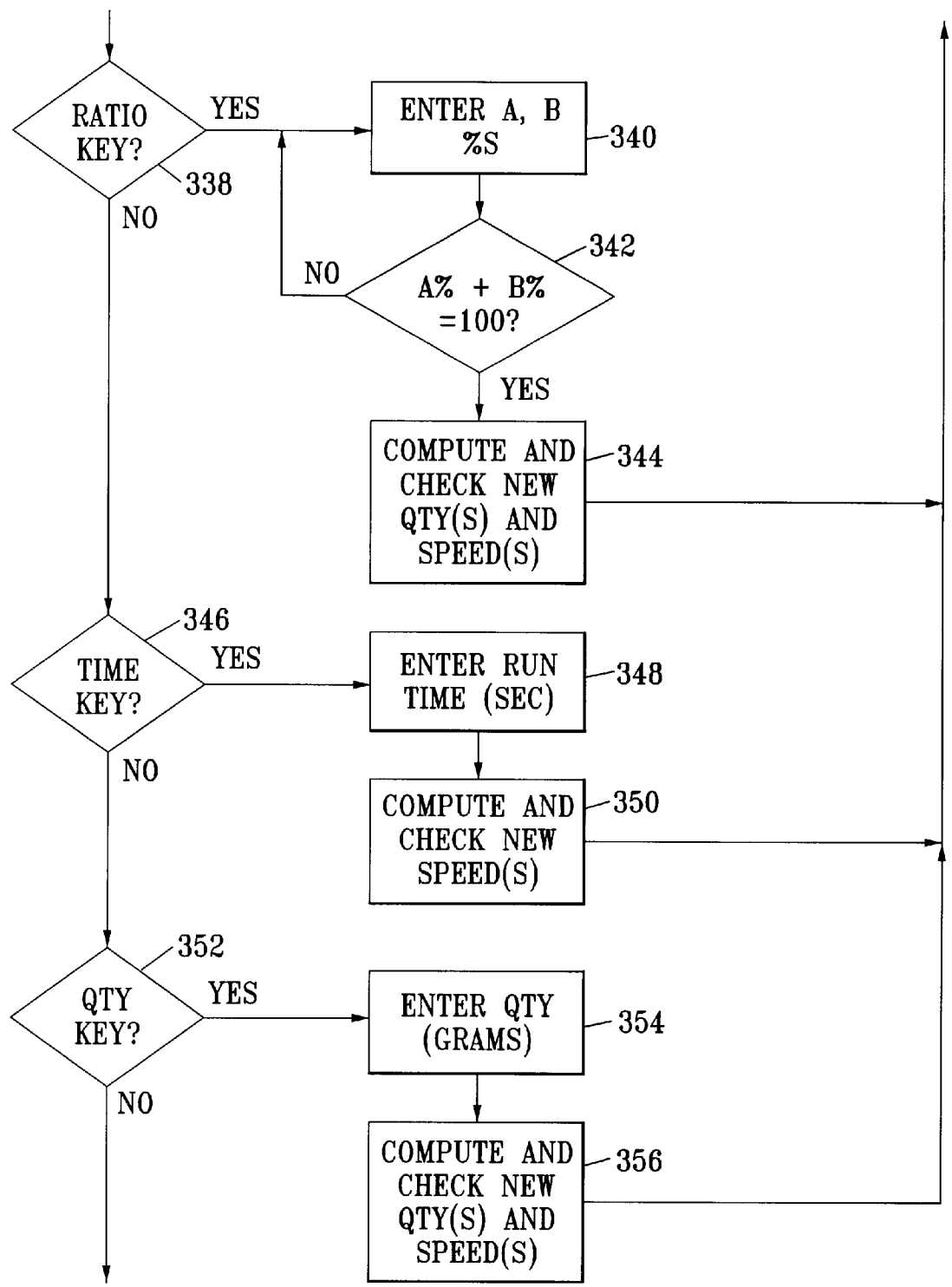
Figure 22:
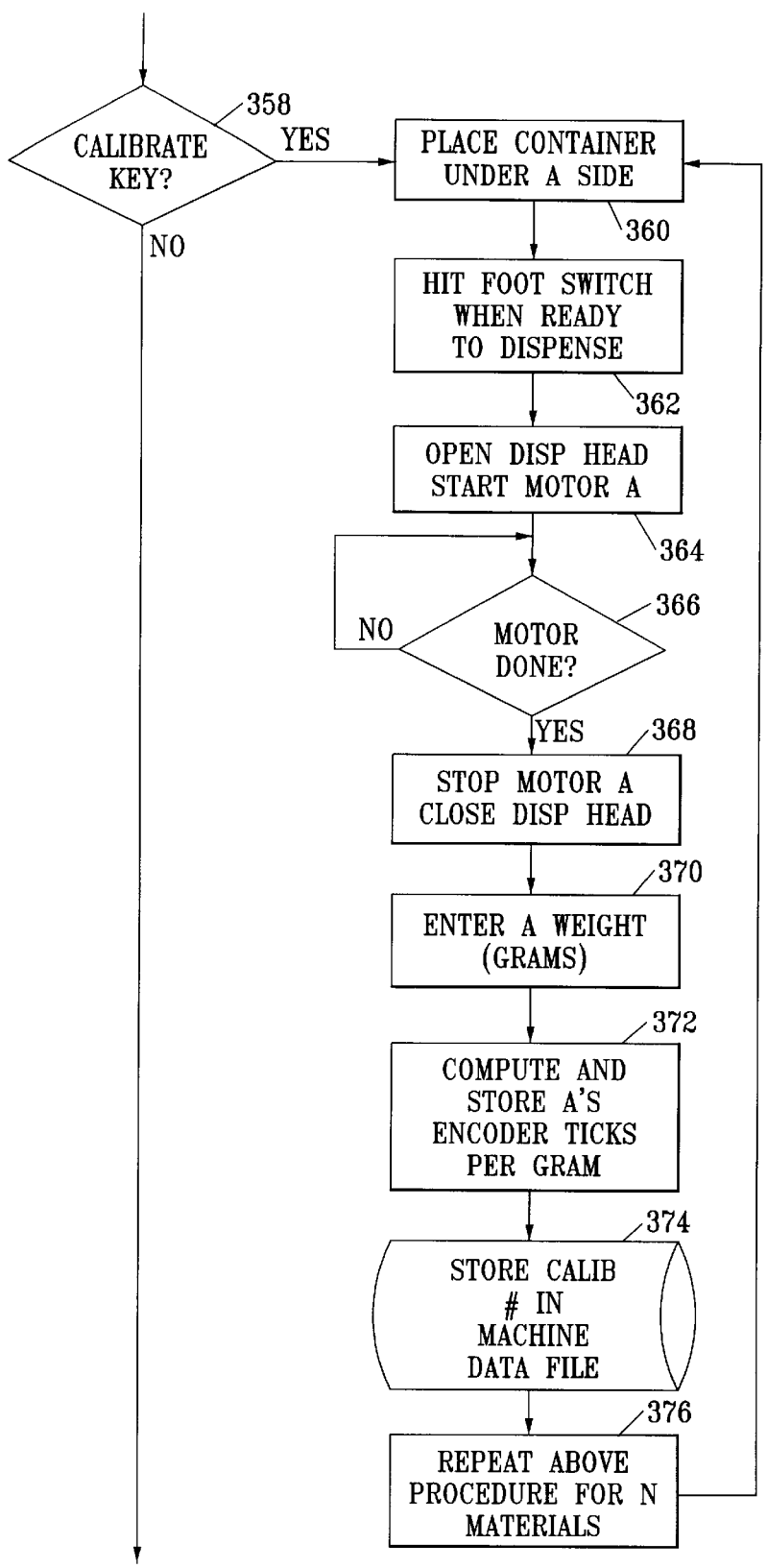
Figure 23:
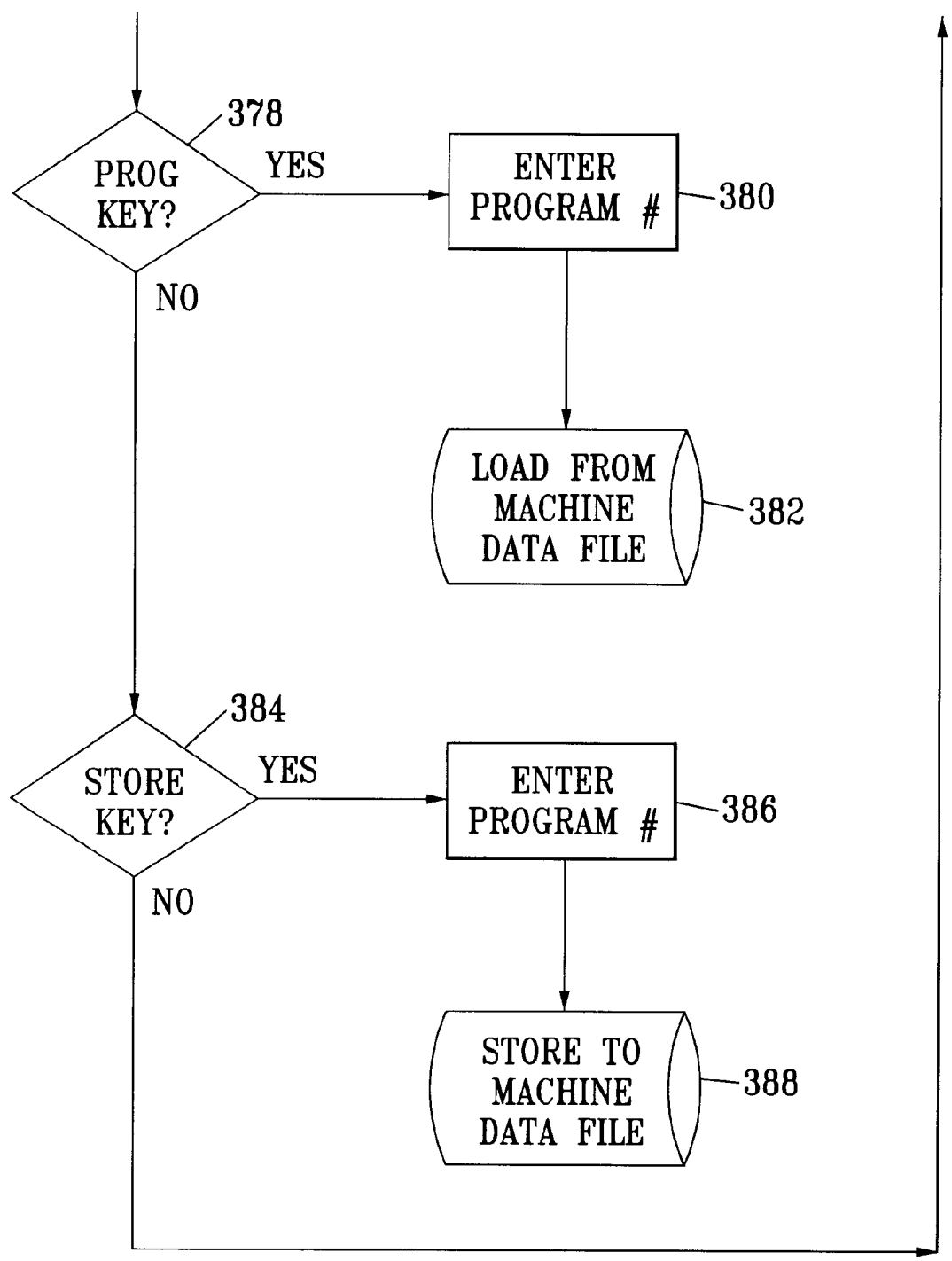

FIG. 18 is a block diagram of a preferred embodiment of a dispensing system of the present invention which meters, mixes and dispenses powders and single or plural component fluids. The dispensing system is capable of dispensing a powder and combining it with a single or plural component liquid, such as epoxy, silicone, urethanes, or adhesives. In FIG. 18, the dispensing system 275 has many of the same or similar components as the dispensing system of FIG. 1. Components that remain the same are identified by the same reference numeral.

The dispensing system 275 has a powder hopper 278 which holds the powder. The powder hopper 278 has powder agitator bars 280 attached to a motor-driven auger 281. As certain powders may not flow over themselves easily, resulting in air pockets, the agitator bars 280 mix the powder to eliminate air pockets. The auger motor 284 drives the auger 281 and is controlled by a motor controller 286. The master control unit 14 sends control signals 287 to the motor controller 286. The auger motor 284 has an encoder 288 for feeding motor information back to the motor controller 286. The master control unit 14 can use the motor information to more accurately control the auger motor 284. For example, the auger motor 284 runs at a constant desired speed. However, as the level of the powder in the powder hopper 278 falls, the current flow required to drive the auger motor 282 at the constant speed decreases. The master control unit 14 can measure the current flow to the auger motor 284 to determine the level of powder remaining in the powder hopper 278.

Alternately, the system can be made to maintain a constant current instead of constant revolutions per second. In this alternate design, as the powder level falls and as the current flow to the auger motor is kept constant, the rotational speed of the auger motor increases. The master control unit 14 can decrease the current to the auger motor when the master control unit 14 detects that the auger speed has increased. The master control unit 14 can also measure the rotational speed of the auger motor 284 to determine the level of powder remaining in the powder hopper 278.

The powder from the powder hopper 278 is dispensed into a centrifugal mixer 282. The singular or plural component liquid is also dispensed into the centrifugal mixer 282. The output of the powder hopper 278 injects the powder into the middle of the liquid. The centrifugal mixer 282 has a stirrer 283 which stirs the powder into the mixture and prevents clumping. The stirrer 283 spins the mixture outwardly where it can be dispensed out of the dispenser output 298. The centrifugal mixer 282 blends the powder and liquid together into a homogenous material which can then be dispensed in various shot sizes or at continuous flow rates. Thixotropic additives can be used to prevent settling of the solids and to help keep the solids suspended in the liquid. Other additives can be included to accelerate the cure time so that less settling of the solids will occur.

The centrifugal mixer 282 is driven by a mixer motor 292 coupled to a gear box 290. The gear box 290 permits the motor 292 to run at the motor's optimal speed while also allowing the centrifugal mixer 282 to run at the mixer's optimal speed which may differ from the motor's optimal speed. Each of the motors in the dispensing systems of FIG. 1 and FIG. 18 has a gear box which for simplicity purposes have only been shown for the centrifugal mixer motor 292. The mixer motor 292 is controlled by a motor controller 294. The master control unit 14 sends signals 295 to control the motor controller 294. An encoder 296 provides feedback information about the mixer motor 292 to the motor controller 294. The motor controller 294 can use the motor information to more accurately control the mixer motor 292.

Thus, the dispensing systems described herein have various types of feedback components. For example, the feedback components may include motor controllers, pressure transducers, flow meters, current detectors and any other components that obtain information about a device (such as a pump, motor, agitator, fluid line) and use (or let a control device use) the information to control the device. The feedback components allow the dispensing system to dispense, meter and mix more accurately.

While the pumps 34, 36 output the same volume of fluid per pump revolution, regardless of the density of the fluid, the dispensing system may require calibration prior to production runs. Prior art dispensing systems required the user to experiment by altering the velocity or time duration of the pump.

The dispensing system of the present invention employs a calibration process which separately calibrates each channel (channel A, channel B, channel C, etc.) of the system. Prior to the calibration run, the user replaces the static mixer tube 50 with a calibration nozzle (not shown). The calibration nozzle does not mix the fluids from the two channels into one output nozzle, but instead has multiple output nozzles, one for each channel. The user then weighs a first container on the scale 54 and zeroes the scale. The first container is placed under one of the output nozzles. The user presses a foot pedal to begin the dispense cycle. The master control unit 14 instructs the pump 34, 36 of each channel to output a certain volume of fluid. Actually, the pumps dispense at a rate equal to 35% of the maximum rated motor speed so as to better "weight" the accuracy of small shot sizes. The fluid from channel A is dispensed into the first container. The user weighs the first container on the scale 54 and inputs the weight in grams into the keypad. Based upon the number of revolutions made by the pump and the weight of fluid dispensed, the master control unit 14 can compare the expected weight of the fluid dispensed with the actual weight dispensed. The master control unit 14 computes a number that represents the number of encoder ticks per gram for channel A. This calibration process is independent of the pump type, gear ratio, encoder resolution, motor horsepower and the like. All of these variables are taken into account in the single computed number. The process is repeated with a second container for channel B.

Advantageously, the effects of temperature, varying pressure, transient imbalance phenomena and other variables on the actual volume of fluid dispensed are eliminated. Such a system also permits the user to dispense accurately by weight or by volume. Additionally, the systems can be calibrated for differing fluids, dispense amounts, flow rates, ratios and the like. This calibration system is quick and easy to execute.

The dispensing system is easily programmable by a user to control or change the flow rate, ratio, quantity and/or other dispensing criteria in any manner. FIG. 19 illustrates how the software flowcharts shown in FIGS. 20–23 fit together. The software flowchart of FIGS. 20–23 controls the overall aspects of the dispensing system. First, in block 300, the system initializes various hardware components such as communication ports, serial ports and other circuits. In block 302, the system loads a machine data file that contains information specific to the system such as the pump types and ratios of the gear boxes. In block 304, the system checks to see if the user enabled the pressure relief switch (i.e., an emergency stop switch). If enabled, the system will shut down the system, interrupt any dispense cycle, stop the pump motors 34, 36 and open the dispense head 49 (Step 306) to relieve the overpressure condition. Otherwise, the system checks the fluid levels in the vats 2, 4 (Step 308). If empty or low, an Empty flag is set (Step 310). If not empty, the system reads the pressure in the pump fluid lines 46, 48 as provided by the pressure transducers 58, 60 (Step 312). If the detected pressure exceeds a preset pressure limit, the system finds overpressure (Step 314), stops the pump motors, and lights LEDs to warn the user (Step 316). When the pressure is within normal operating conditions, the user can dispense in either a timed dispense mode or a continuous run mode. The system checks if the user entered a time duration for the dispense cycle (timed dispense mode) in Step 318. If YES, the system waits for the user to depress the foot pedal (Step 320) and in response, the system starts the dispense cycle and the system retrieves the desired time, calculates the stop time, opens the dispense head and starts the pump motors (Step 322). If the system was in a timed run mode and the time has expired (Step 324), the system will stop the pump motors 39, 41 and close the dispense head (Step 326).

If the user selected the continuous run mode instead of the timed run, the system waits for the user to depress the foot pedal (Steps 328, 332) which causes the system to open the dispense head and start the pump motors (Steps 330, 334). At Step 336, the system checks to see if any user inputs were made on the LCD display panel. At any time other than a dispense cycle, the user may enter the set parameters routine via the data entry keyboard 20 or 22.

The user's depression of the Ratio key (Step 338) allows the user to enter the desired ratios for each constituent fluid (Step 340). If the desired ratios do not total 100%, the system will require the user to re-input desired ratios (Step 342). When correct ratios are entered, the system computes the new quantities of fluids desired and recalculates the correct pump speeds to use (Step 344).

If the user depresses the Time key (Step 346), the user may input the desired run time (Step 348). The system then computes the correct pump speeds for this desired run time (Step 350).

If the user depresses the Quantity key (Step 352), the user may input the desired total quantity of the end product in grams (Step 354). Based upon the desired weight of the end product, the system calculates new quantities and pump speeds (Step 356).

If the user depresses the Calibrate key (Step 358), the user can start the calibration process. In the calibration process, the user places a container under the output nozzle of channel A (Step 360). The user starts the dispense cycle by depressing the foot pedal (Step 362), which causes the dispense head to open and the pump motors to start (Step 364). At Step 366, the system checks to see if the dispense cycle is completed. If YES, the pump motors are stopped and the dispense head closed (Step 368). The user takes the container with the dispensed fluid from channel A, weighs it on the scale 54, and enters the weight in grams on the keypad (Step 370). The system takes the weight information and computes the number of encoder ticks per gram (Step 372). Alternately, the system could calculate the density of the fluid as grams/cc. The calibrated number of ticks per gram for channel A is saved in the machine data file (Step 374). This calibration procedure is repeated for each fluid (Step 376).

If the user depresses the Program key (Step 378), the user may select a program (Step 380) previously stored in the machine data file. This selected program which may contain the user's most commonly used ratios or quantities is loaded into the system (Step 382).

If the user wants to save a program into the machine data file, the user depresses the Store key (Step 384) and saves the program under an identifying program number (Step 386). This new program is stored by the system in the machine data file (Step 388).

Figure 24:
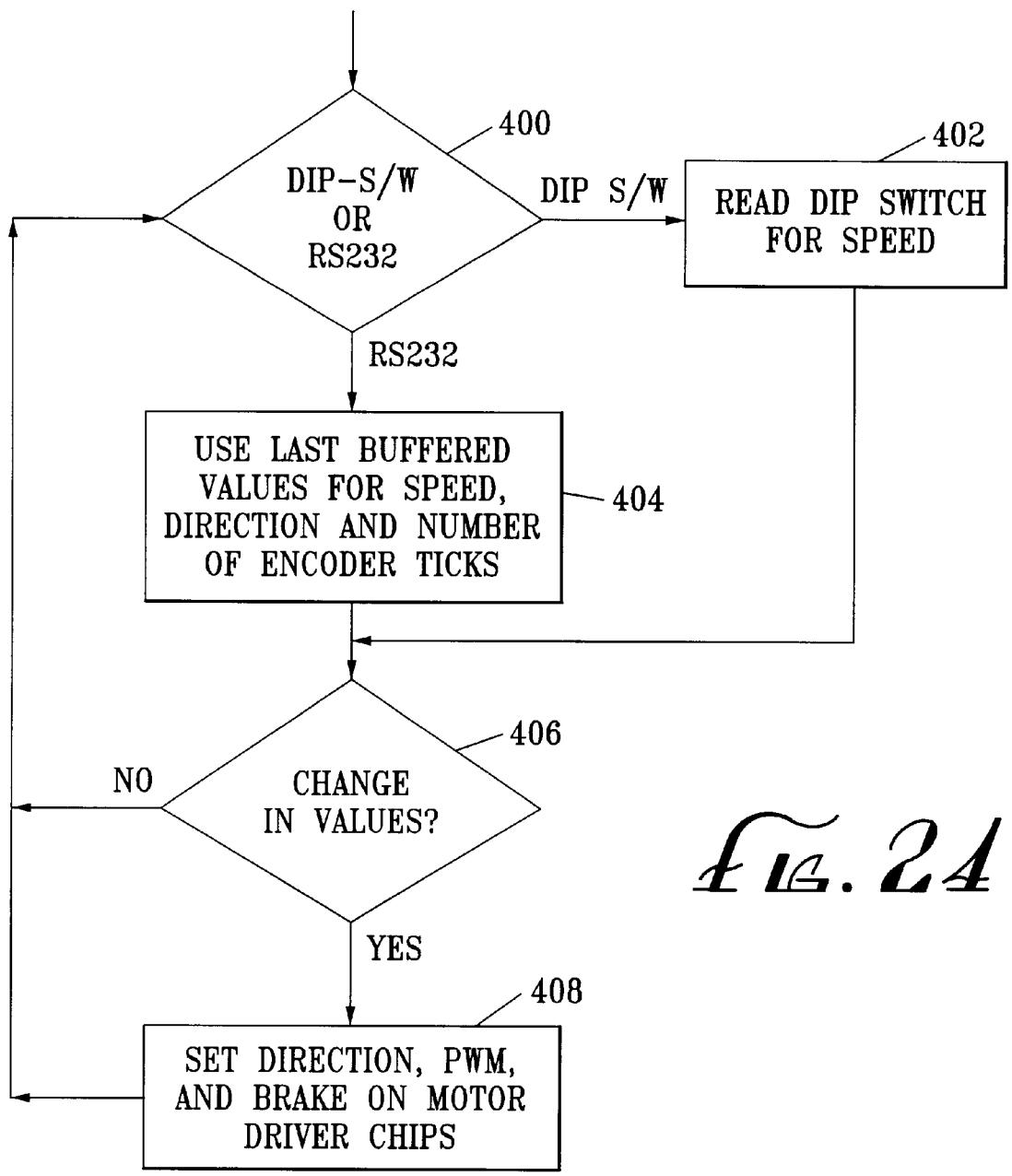
FIG. 24 is a software flowchart that describes the RS232 and DIP switch software for the motor controller.

Turning to FIG. 24, the software flowchart for controlling the motor controller 180 over the RS232 port 230 and DIP switch 232 is shown. As previously indicated, the motor controller can control the speed, direction and on/off of the motor. Starting at Step 400, the system checks to see if information was received over the RS232 port or the DIP switch. If the information came from the DIP switch, the DIP switch settings are read (Step 402). If information was received over the RS232 port, the system retrieves the last buffered values for the speed, direction and desired number of encoder ticks for the motor controller. At Step 406, the system compares the new values with the old values. If the new values are different, the new values are saved and used by the power drivers 200 to control the motor (Step 408).

Figure 25:
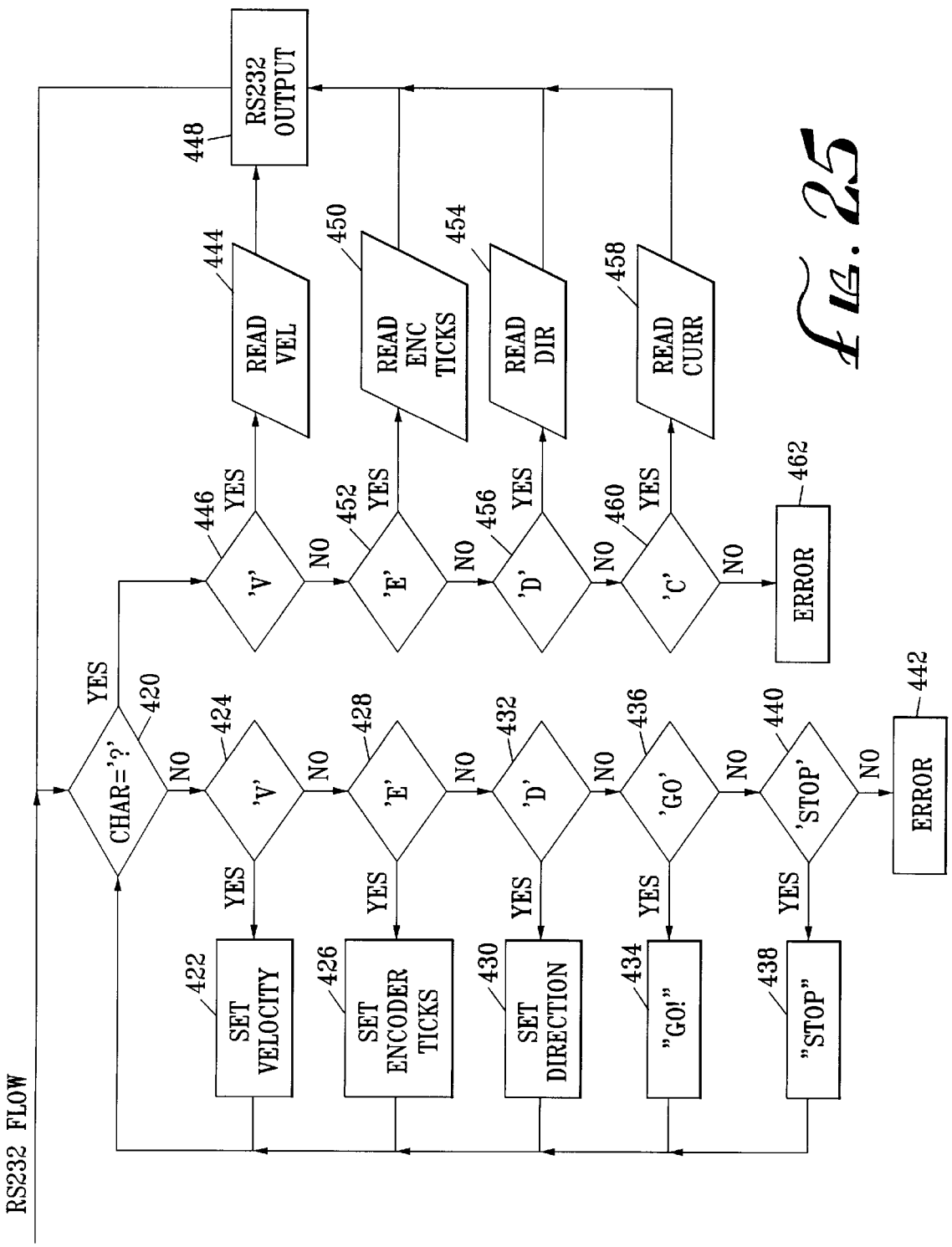
FIG. 25 is a software flowchart that describes the RS232 data flow in the motor controller.

The software flowchart of FIG. 25 illustrates how the master control unit 14 of the system controls and queries the motor controller 180. The master control unit 14 uses the RS232 port 230 either to set new values into the motor controller or to query the motor controller for these values. If the master control unit 14 wants to set new values into the motor controller, the master control unit sends a command to the motor controller that is not prefaced by the "?" character (Step 420). The master control unit 14 can set the desired velocity of the motor (Step 422) with a "V" command (Step 424), the encoder ticks (Step 426) with an "E" command (Step 428), or the direction of the motor (Step 430) with a "D" command (Step 432). The master control unit 14 can instruct the motor controller to start the motor (Step 434) with a "GO" command (Step 436) or to stop the motor (Step 438) with a "STOP" command (Step 440).

If the master control unit 14 wants to query the motor controller for the velocity of the motor (Step 444), the master control unit 14 sends a "V" command prefaced by a "?" (Step 446) which causes the motor controller to output the velocity information onto the RS232 line (Step 448). Similarly, the master control unit 14 can obtain the encoder ticks read (Step 450) with an "E" command (Step 452), the direction of the motor (Step 454) with a "D" command (Step 456), or the current flow to the motor (Step 458) with a "C" command (Step 460). Erroneous commands are indicated by Steps 442 and 446.

Figure 26:
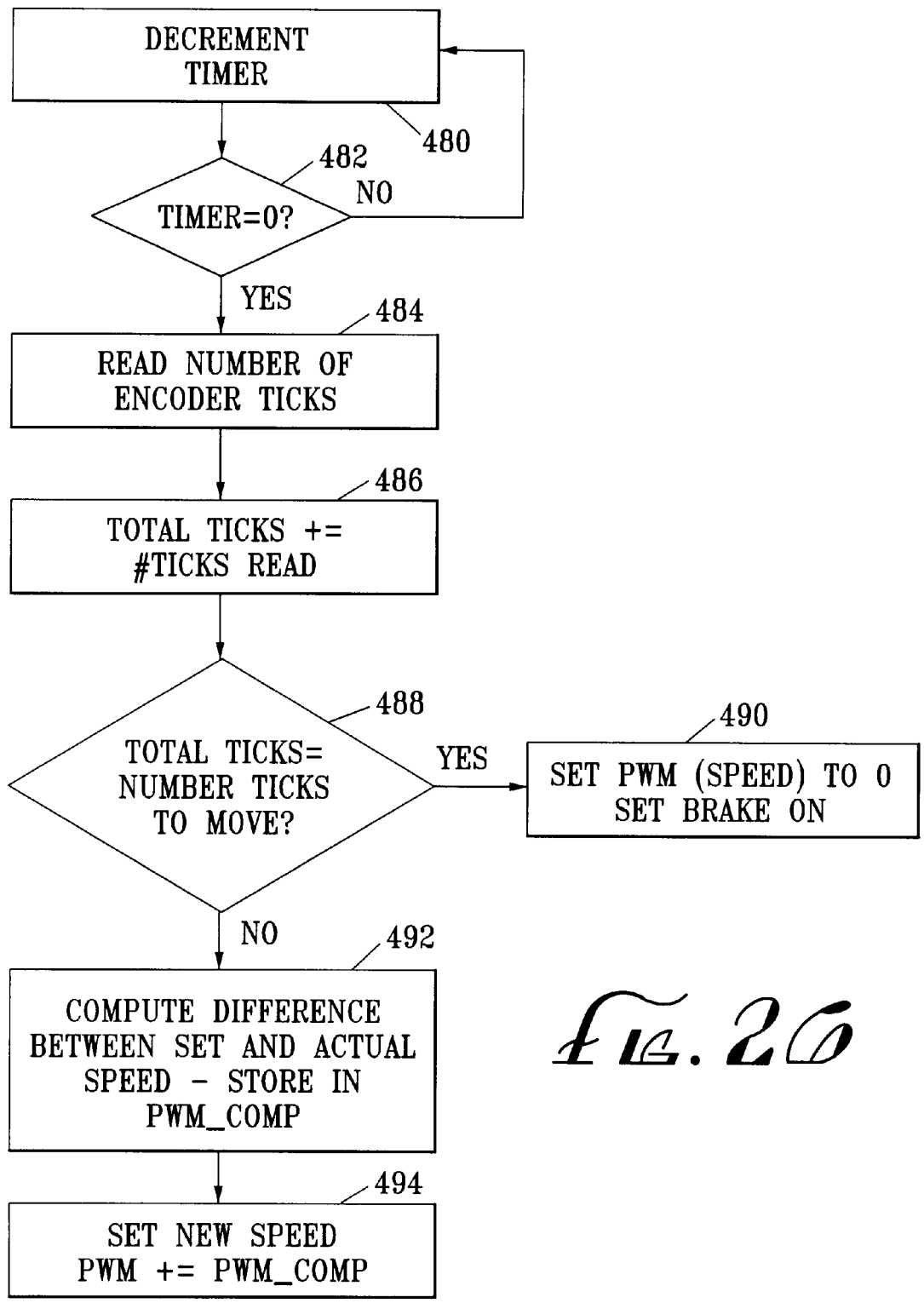
FIG. 26 is a software flowchart that describes the motor controller timer interrupt software.

The motor controller 180 uses a timer interrupt scheme to ensure that the motor is accurately controlled. FIG. 26 shows the software flowchart for this timer interrupt. A timer is set to the Timeout period (Step 480) which may be approximately 6 milliseconds. When this timer expires (Step 482), the motor controller reads the number of encoder ticks read during the 6 millisecond period (Step 484) and updates the total number of ticks read thus far with this number (Step 486). The motor controller then compares the total number of ticks read against the desired number of ticks to be read (Step 488). If the numbers match, the motor controller directs that the motor should be braked and stopped (Step 490). If the numbers do not match yet, the motor controller compares the number of ticks read during the 6 milliseconds with the desired number of ticks to be read during the 6 milliseconds and determines whether the actual motor speed is too slow or too fast (Step 492). If the actual speed is too slow or too fast, the motor controller adjusts the speed (Step 494).

Following are various systems providing specific categories of function and usage built upon the foregoing system, a spray system, a system for retaining material in a progressive cavity pump, a dispensing system for pressured charging of molds and a high flow rate system. Various control schemes are employed to facilitate operation in such uses.

Figure 27:
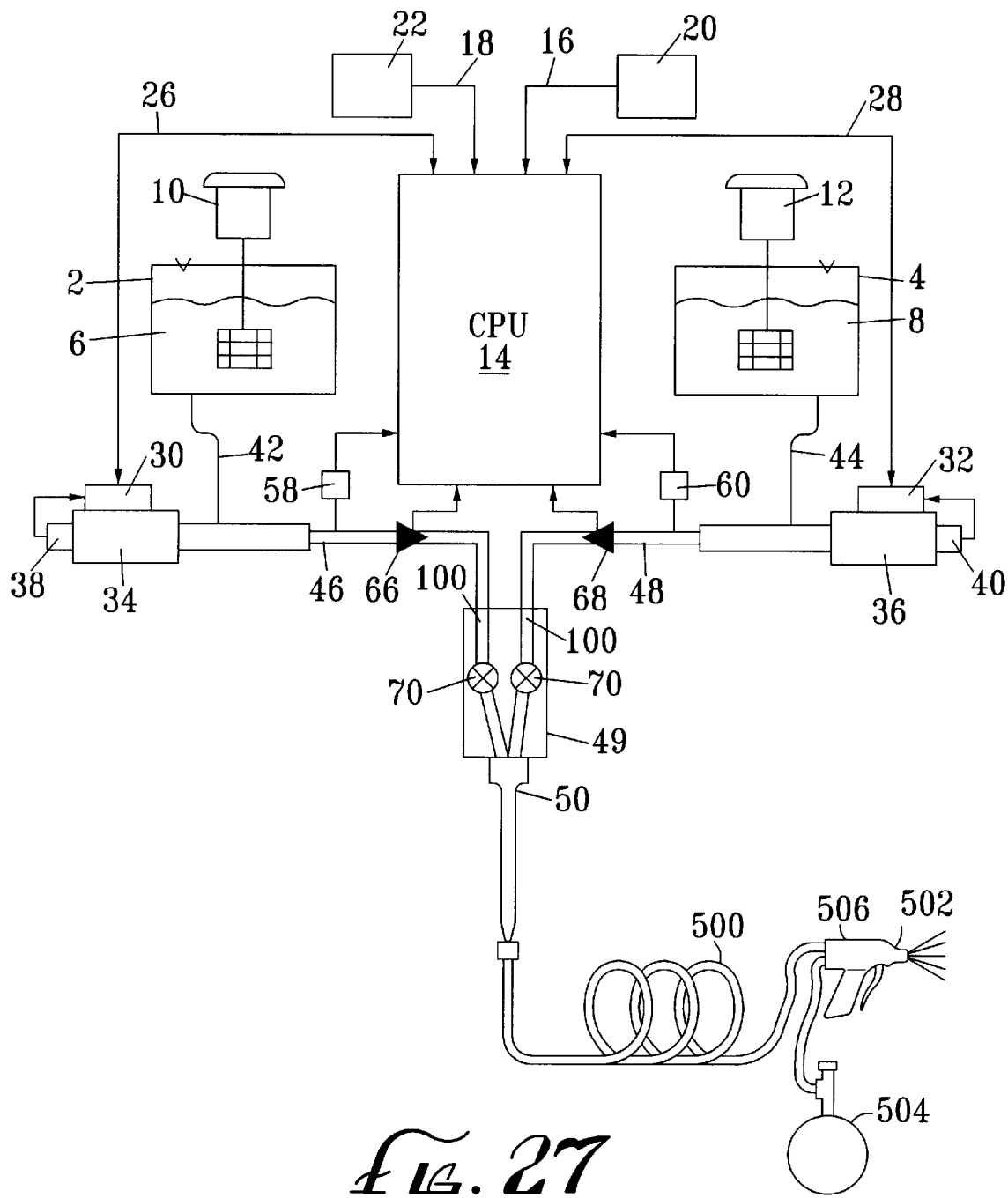
FIG. 27 is a block diagram of a dispensing system useful with a spray gun.
Figure 28:
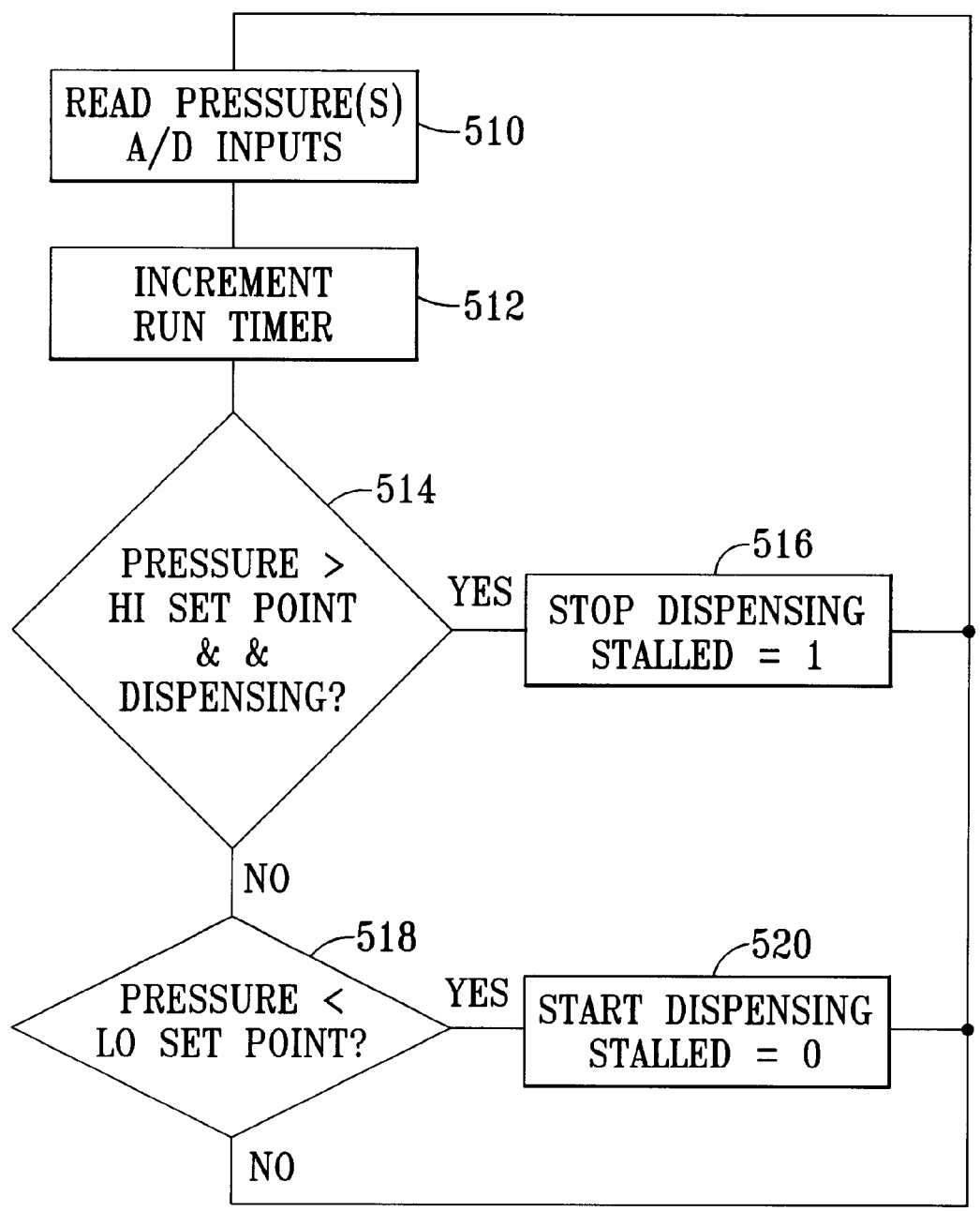
FIG. 28 is a software flow chart that describes motor control of the device of FIG. 27.

FIG. 27 and FIG. 28 illustrate a system which may be employed for spraying paint or the like. The system is particularly useful where mixing is to occur between two elements of the material sprayed. Structurally the device is much like that disclosed above. The reference numbers are taken from the preceding embodiments and reflect common equipment. Associated with the static mixer tube 50 is a dispensing conduit 500. The dispensing conduit 500 is resilient in the ranges of pressures encountered with the pumps 34 and 36. The resilient quality of the dispensing conduit 500 can operate as an accumulator to lessen pressure spikes and generally cause the control system to be less sensitive.

A nozzle 502 is associated with the distal end of the dispensing conduit 500. The nozzle 502 may include the introduction of a source of compressed air 504 such that the dispensed liquid and pressurized air form an appropriate spray for painting or other uses. Without the air, liquid deposition through a different nozzle 502 is equally possible.

A valve 506, which may include a trigger, controls the flow to the nozzle 502. When compressed air is also supplied, the valve 506 would control the source of compressed air 504 as well.

The valve 506 is not associated with the controllers 30 and 32 for the pumps 34 and 36. As progressive cavity pumps are employed, it is impractical to control the system by stalling the pumps. Consequently, some mechanism is required to control the pumps 34 and 36 when the valve 506 is closed. Only in this way is overpressure within the system and potential damage to the pumps themselves avoided. Direct electrical control from the valve 506 to the pump controllers 30 and 32 is normally inappropriate because the variety of uses of such systems may include highly flammable materials in a vaporized state.

Control can be provided by one or more pressure sensors used to provide input to the controllers 30 and 32 to control the pumps 34 and 36. Pressure transducers 58 and 60 provide the appropriate input. When the valve 506 is closed, the pressure transducers 58 and 60 recognize an increase in pressure. When the valve 506 is opened, a decrease in pressure is recognized. The master control unit 14 is employed to cause the controllers 30 and 32 to properly respond to the changes in pressure determined by the transducers 58 and 60.

Looking to the software flow chart of FIG. 28, the control logic responsive to the transducers 58 and 60 and controlling the controllers 30 and 32 is presented. With the system initialized, the pressures from one or both of the transducers 58 and 60 are read in an A/D input (Step 510). An increment run timer (Step 512) keeps track of incremental time. The pressure from one or both of the transducers 58 and 60 is compared with a preselected high set point (Step 514) when the pumps are dispensing. If the pressure is greater than the high set point and the pumps are dispensing, dispensing is terminated and an increment run time is initiated with the stalled counter set to one (Step 516). When the pressure is either above the high set point but the pumps are not dispensing or the pressure is below the high set point regardless of whether or not the pumps are dispensing, the pressure is compared with a preselected low pressure set point (Step 518). If the pressure is lower than the low set point, a start dispensing signal is given (Step 520) and the stalled counter is reset to zero. If the pressure is greater than the low set point, nothing changes. Consequently, if the pumps are dispensing, they will continue to dispense. If the pumps are not dispensing, the stalled counter will continue to accumulate.

With the foregoing software logic flow, a system such as illustrated in FIG. 27 may be activated once the dispensing conduit 500 has been put in place. The valve 506 is opened and the controllers 30 and 32, recognizing a pressure below the low set point (Step 518) starts the dispensing (Step 520). Once the dispensing conduit 500 is charged, the nozzle 502 may be closed. With the valve 506 closed, the pumps 34 and 36 continue to build pressure until the pressure approaches, reaches or exceeds the high set point (Step 514) where dispensing is stopped (Step 516). When the system is to be used, air is provided to the valve 506 and the liquid mixture is up to pressure. As the valve 506 is opened, a spray is dispensed from the nozzle and the pressure within the system begins to fall. When the pressure approaches, reaches or falls below the low set point (Step 518), the controllers 30 and 32 are energized to activate the pumps 34 and 36. The pumps 34 and 36 run until pressure again climbs above the high set point (Step 514). The increment run timer (Step 512) may be used to determine the length of time since flow was experienced within the system, the time since the last initialization. Depending on the material, a preselected time may be chosen to provide a warning before the substance being dispensed hardens up, cures or may otherwise become mechanically coalesced. A signal generator may be hooked with the increment run timer to provide the appropriate warning signal.

As previously discussed with prior embodiments, the motors 34 and 36 are controlled to operate at the same time and at different flow amounts such that an appropriate ratio is created and always dispensed. With the pressure activated control, the motors are designed to start up and shut down together and to run at a preestablished proportion. This insures consistent mixtures regardless of the timing and operating of the valve 506.

A system is contemplated for maintaining constant conditions in a mixture of materials in a progressive cavity pump while the outlet is closed. The system contemplates periodic motion which can prevent the settling or mechanical coalescing of materials and inhibit the formation of a set in the flexible stator material. These conditions could otherwise increase the power needed to start the rotation of the pump. The pump rotor is rotated in one direction a partial turn and then rotated in the other direction a partial turn. The second rotation is controlled to create the appropriate static pressure within the device. In the example routine of FIG. 29, the pumps are first rotated backward and then forward. The opposite sequence is also applicable.

Figure 29:
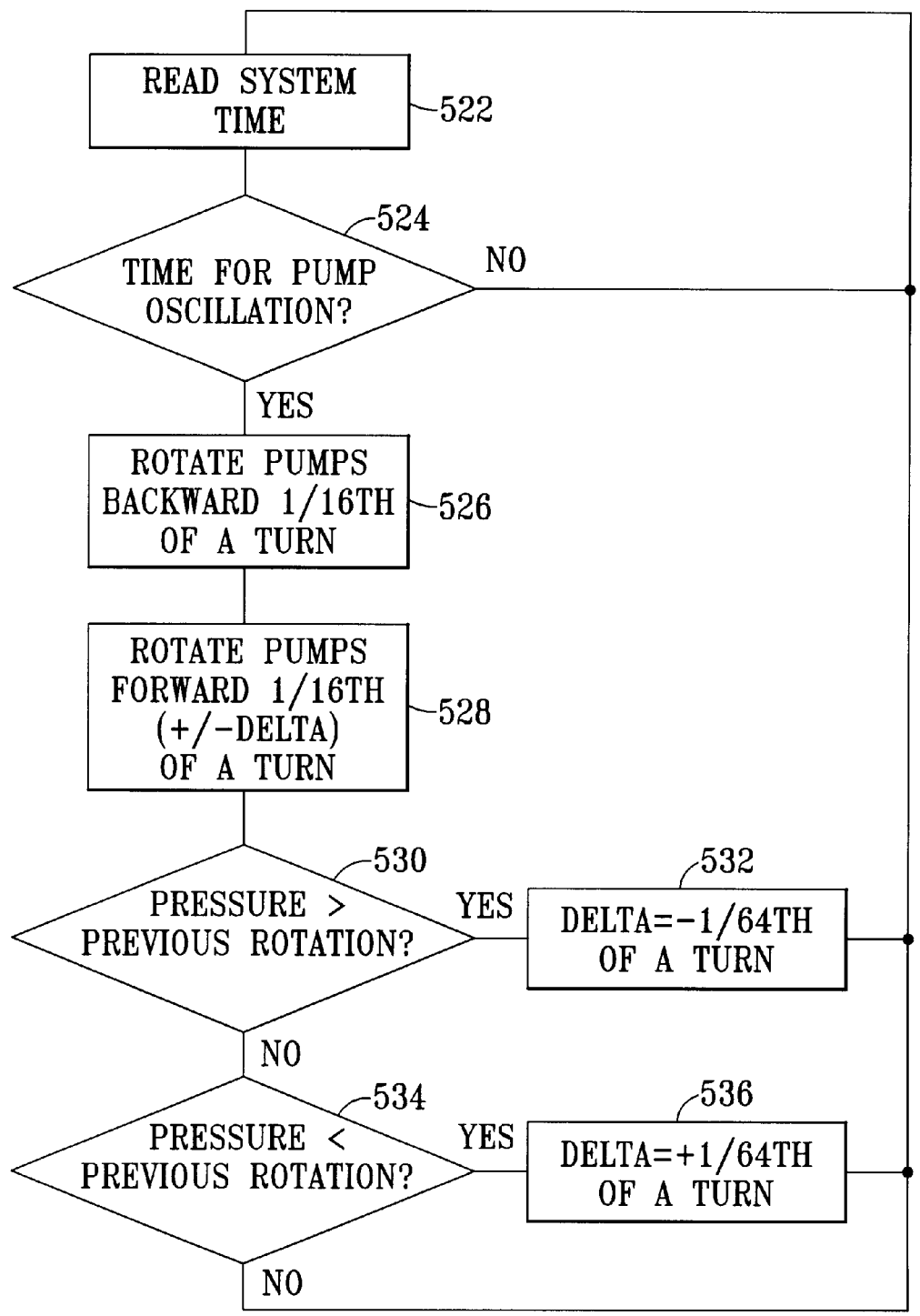
FIG. 29 is a software flowchart of an oscillation routine for maintaining material in a progressive cavity pump.

Looking at the software flow chart of FIG. 29, a routine is entered with the pump or pumps in the nondispensing mode. A clock within the controller 14 keeps time (Step 522). The time is periodically read (Step 524) for either specific times from initiation of the routine or intervals from the last cycle. When it is time to initiate the cycle, the pumps rotate backward one-sixteenth of a turn (Step 526). Next the pumps are rotated forward a partial turn which is nominally one-sixteenth of a turn but for the determinations made below. Once the cycle of backward and forward revolutions is complete, the pressure prior to the cycle is compared to the pressure after the cycle. If the new pressure is greater than the prior pressure before the cycle (Step 530), the forward rotation of the pump is decreased by one-sixty-fourth of a turn (Step 532). If on the other hand, the pressure is less than the pressure prior to the cycle (Step 534), then the forward rotation is increased by one-sixty-fourth of a turn (Step 536). It is, of course, the succeeding cycle which is affected by Steps 532 and 536. Through the change to the forward rotation, appropriate pressure levels can be maintained while agitation is provided to the materials within the pump cavities. In no case will the pressure be allowed to increase beyond the higher set point limit.

Alternatively, a feedback system may be employed to maintain constant conditions with such periodic oscillation cycles. In the use of a backwards and forwards scheme, the limit on the forward motion may be through a pressure sensor 58, 60 with the forward movement terminating when a preset pressure is achieved through a partial forward rotation.

As dispensing systems are dependent on pressure integrity for accuracy, it is of value to constantly monitor the system for leaks. In normal dispense modes, the system will run at a characteristic pressure in each channel, depending on viscosity and flow rate which does not account for leakage. A dispense system using progressive cavity pumps can maintain proper pressure by the method of oscillation described when not dispensing. It also can detect leaks by determining how much the pump must move past the starting point to maintain pressure over a series of such oscillations. If the oscillation backwards and then forwards at a set pressure includes continued advancement, either incrementally or continuously, to a new radial location, then there is a leak in the system, either at the pump stator/rotor interface or at some other location. This self diagnosis can be detected by the controller and reported to the user interface for action by the user. Either a large forward displacement or a large accumulation of incremental displacements is sensed and a signal is generated when the forward displacement exceeds a preset amount.

Figure 30:
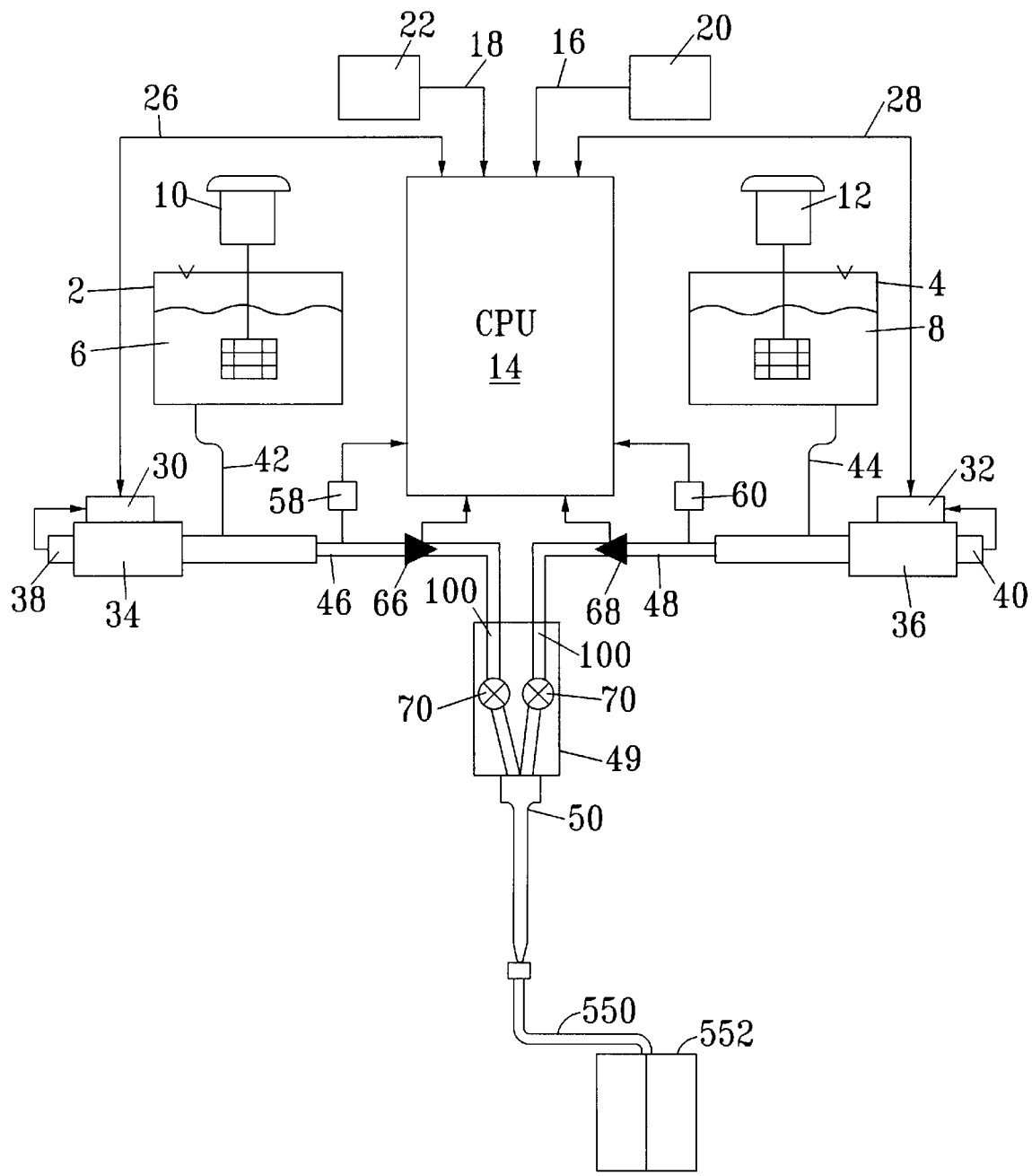
FIG. 30 is a block diagram of a dispensing system for pressure charging a mold.

The dispensing system may be configured for use in charging a mold. Reference is made to FIG. 30. Molds come in a great variety of types, configurations and sizes. The mold cavities are made from a great variety of materials and by a great variety of techniques. Some molds are relatively fragile in the sense that it is possible to damage the mold through the application of excessive pressure in charging. Further, often viscous materials are used as the charging material. Pressure is required to charge the molds with such materials to run such an operation on an economically viable basis. Therefore, it is advantageous to provide a system capable of rapidly charging a mold without exceeding stringent pressure requirements.

A dispensing system is illustrated as including the base mechanisms as previously disclosed. A charging conduit 550 is directed from the static mixer tube 50 to a mold 552. The charging conduit 550 is in pressure flow communication between the static mixture tube 50 and the mold 552. Relief exists within the mold 552 for displacement of the air from the cavity as the charge is introduced.

In charging a mold with viscous material, pressure can build up at the charging port before the mold is filled. Such pressure can exceed the mold strength in fragile molds. Consequently, maximum pressure can be reached with more charging to be accomplished. However, the pressure will drop as the material flows into the extremities of the mold. As this occurs, charging can be resumed. As the mold begins to approach a full charge, the charging pressure ramps up more quickly. The remaining areas to be filled are smaller proportionally to the flow rate of the charge. Further, such areas are typically at the extremities of the mold, well displaced from the charge port.

To maximize charging rate, an interactive system may be used. Two charging pressures may be preselected. The first is the maximum charge pressure with which the mold is to be burdened. The second is a preselected lower pressure where charging may be resumed to good effect. A first charge may be introduced to the mold until the upper pressure limit is reached. The charging is then terminated until the charging pressure drops below the lower predetermined pressure. At this time, charging is resumed. Cycling on and off occurs until a predetermined rate of increase in pressure is sensed. Once the predetermined pressure rate is reached, the flow rate of the charge is reduced. The reduced rate prevents rupture of the mold and excessive cycling of the dispensing system. By having multiple charging rates selected by the rate of pressure increase during charging, a higher lower pressure may be empirically determined to minimize charging time. A higher initial charging rate can also be used. The system may also sense when the charge is complete through a lack of pressure reduction at the mold port.

Figure 31:
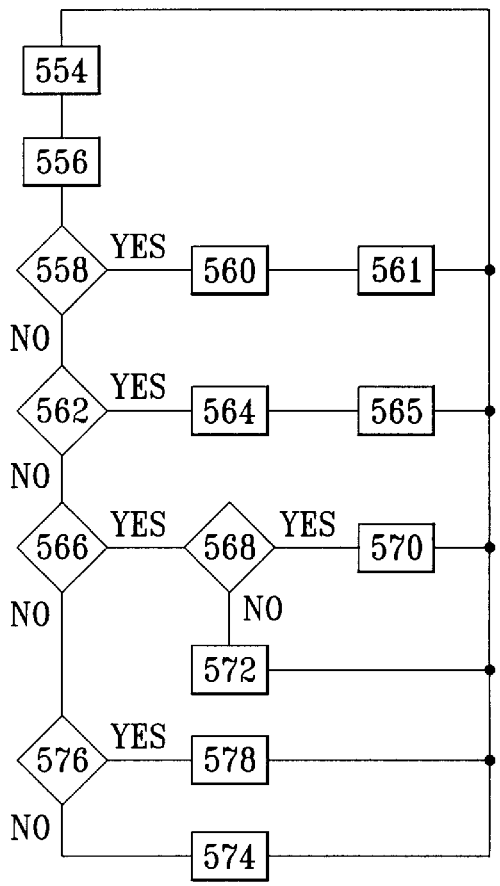
FIG. 31 is a software flowchart for the device of FIG.

In accomplishing the foregoing, a pressure sensor is to be in communication with the pressure flow to the mold. The pressure sensors 58 and 60 may be employed. Where greater sensitivity is required, the pressure may be sensed at or near the charging port at the mold 552. The motors 34 and 36 are controlled by the controller 14 based upon the input of the pressure sensors. Looking at FIG. 31, the pressures are first read and provided to the master control unit 14 by A/D inputs (Step 554). A timer (Step 556) is provided to measure incremental run times as controlled by the system. The pressure is compared to a high set point (Step 558). If the pressure is greater than the high set point and if the system is charging, the controller enters a STOP mode and a command to stop charging is given (Step 560). The stalled counter is also set at 1 (Step 561).

If either the pressure has not risen so high as the high set point or the device is not charging, the pressure is compared with the preselected low set point (Step 562). If the pressure is found to be below the low set point, the controller enters a START mode and a command is given to start dispensing (Step 564). The stalled counter is initialized to 0 (Step 565). When the pressure is higher than the set point (Step 558), the stalled counter is set to 1 (Step 561) so that the increment run timer begins to track the time that there is no dispensing.

During the time that there is no dispensing, the pressure drops within the mold. The pressure is periodically checked to determine when further charging should occur. When the pressure is greater or equal to the low set point and there is no dispensing (Step 566), the stalled counter is compared with the preselected total time, Timeout, for determining a full mold (Step 568). If the mold is full, i.e., the pressure did not drop to the low set point within the preselected allotted time, the stalled counter surpasses the allotted time, the counter enters an END OF CYCLE mode and the cycle is terminated (Step 570). The stalled counter is set to 0 (Step 570). If the preselected Timeout is not surpassed, an increment is added (Step 572) to the increment run timer. This continues until the pressure drops below the low set point and dispensing is reinitiated or the Timeout period is exceeded. With the dispensing initiated (Step 564), the pressure rises above the low set point. Before it reaches the high set point, the stalled counter is incremented (Step 574) with each cycle.

A pressure rise rate greater than a preselected amount indicates the mold is getting full. The lack of pressure drop indicates that the mold is full. With the pressure between the high set point and the low set point and the pumps dispensing a charge, the stalled counter is compared with the time differential of pressure as a percentage of the total amount of time used to check whether the mold is full, Timeout (Step 576). If pressure is rising above a certain rate, the controller switches to a LOW FLOW mode and flow rate is reduced (Step 578). Until the charging is complete, the system will now charge at the lower rate. Accordingly, charging is cycled on and off as pressure rises and falls within the charging port to the mold. When the mold is almost full, the rate of pressure increase exceeds a preselected value and the rate of charging is slowed. Finally, when the pressure fails to drop during the nondispensing mold, indicating that the mold is full, the charging cycle is terminated. Total dispense quantity as the mold is filled can be monitored and the pressure controlled or profiled on a predetermined basis to fill the mold as efficiently as possible. Such factors as material setting time, air evacuation, and void filling may be taken into account, as well as pressure.

In certain applications, such as low pressure painting, mold filling and other pressure maintenance applications, high pressures can be undesirable to disastrous. Progressive cavity pumps typically provide positive displacement with a high mechanical advantage that can create extremely high pressures. As the rate of pressure increase gets higher, the possibility for overshooting becomes correspondingly higher and, for example, low pressure molds can be damaged. Consequently, in applications requiring close pressure control, more sophisticated system controls are appropriate.

It is often desirable to maintain a given material delivery pressure rather than a specific flow rate. This may be beneficial for the application or simply as a means to avoid overpressure. This is true of paint spray applications as well as mold filling applications. In a typical mold filling application, material is delivered with a constant maximum available pressure throughout the cycle. When the mold is empty, a rather high flow rate is possible without exceeding this maximum pressure. As the mold fills, the maximum flow rate decreases as the back pressure of the material filling the mold increases as explained above.

Figure 32:
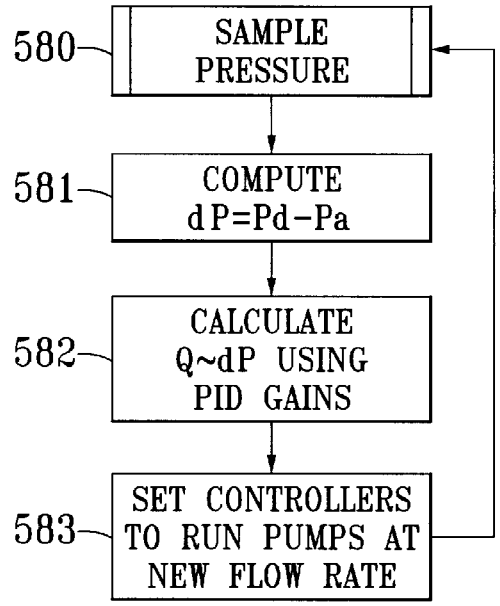
FIG. 32 is a flow chart of a constant pressure system.
Figure 35:
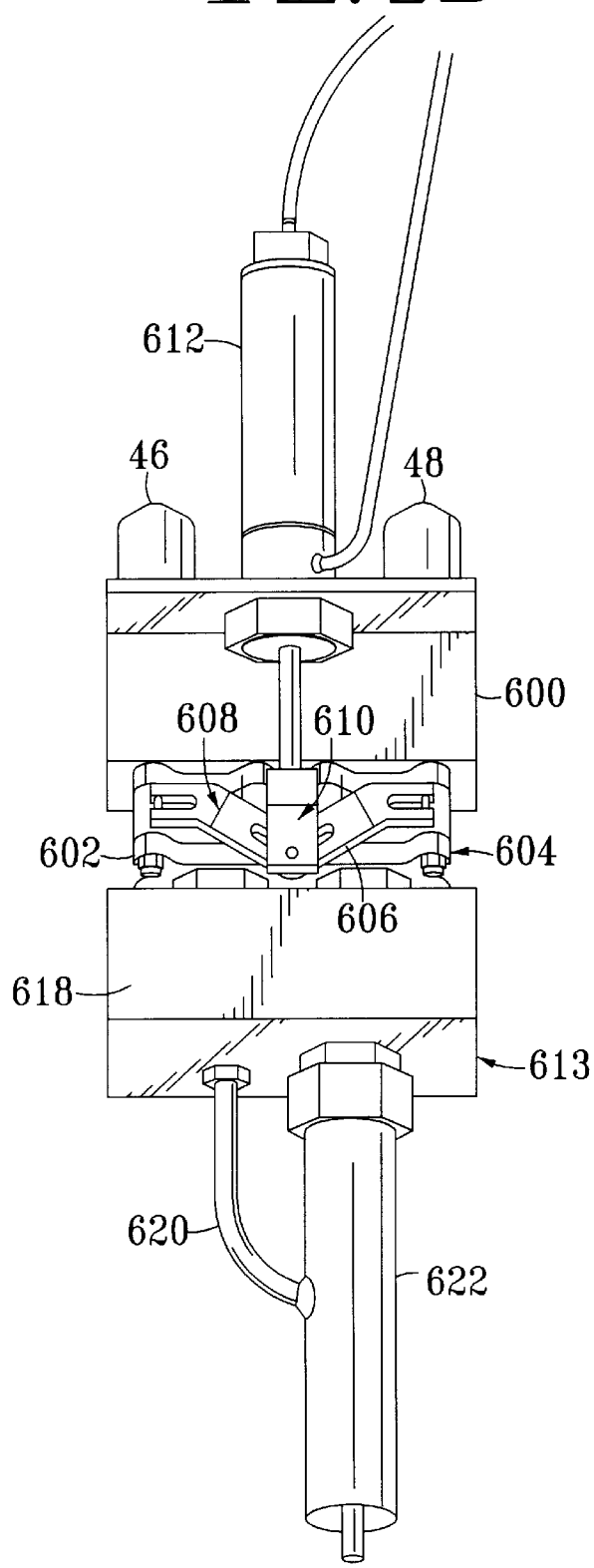
FIG. 35 is a front view of a dispense head assembly.
Figure 36:
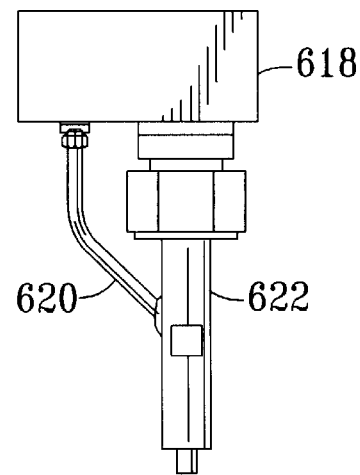
FIG. 36 is a side view of a high flow manifold.
Figure 37:
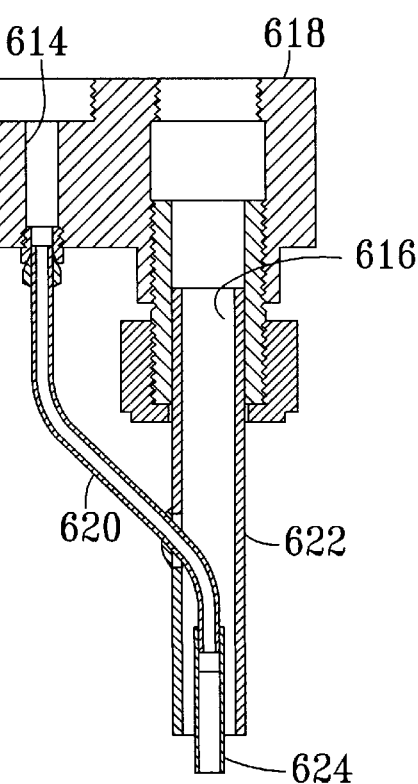
FIG. 37 is a cross section of the manifold of FIG. 34.

A feedback loop may be employed through the pump control system to control the flow rate to a mold as a function of the pressure differential to maximize flow rate, minimize charging time, and maintain a given delivery pressure. The pressure differential is the difference between the desired pressure and the actual pressure. The loop is a straightforward PID (proportional, integral, derivative) loop. The pressure differential is used as the error term to determine the proper flow rate to maintain pressure. This loop is illustrated in FIG. 32 and the mechanism in FIGS. 27 or 30.

The pressure (Pa) is sampled (Step 580). The sampling occurs at the pump outlet which may be any point between the pump and the ultimate point of discharge. Appropriate factors responding to empirical observations based on the position of the pressure sensor can be incorporated. The pressure differential (dP) is then computed (Step 581) by comparing the preselected target pressure (Pd) previously input into the system with the actual pressure (Pa), $dP_s = (Pd-Pa_s)$. The subscript s denotes successive samples.

The flow rate (Q), actually the rate at which the motor or motors are to be driven, is then calculated as a function of the differential pressure (Step 582). This is accomplished using the PID gains where:

$G_p$ is the proportional gain, $G_i$ is the integral gain, $G_d$ is the derivative gain.

The flow (Q) is then calculated as follows:

$$Q = G_p \cdot dP_s + G_i \cdot (dP_s + dP_{s-1}) + G_d \cdot (dP_s - dP_{s-1}).$$

This calculation generates a flow rate (Q) which is then employed to set the controllers to establish pump speed (Step 583). Pump speed is achieved by pulse width modulation (PWM) through an amplifier to regulate motor torque. Feedback through an encoder provides speed control over the controller regulating torque.

The pump control system may provide virtual stall to the system. An attribute of many pumping systems which employ pressurized air for driving the pump provide a mode of operation where the pump is controlled by an output valve. The air pressure is not turned off during nonuse. Rather, a stall condition is established by back pressure in the pump outlet. When that back pressure rises to a level that the air pressure forces and the fluid pressure forces are equal, the pump stalls. The pump then remains in that condition until further demand is placed at the outlet by opening the valve. The pump then reinitiates operation until again stalled. This operation may not necessarily result in complete stoppage. Where viscous flow or greatly throttled flow is experienced, the back pressure can approach the complete stall point but allow slow continuing pump operation. This stall attribute of, for example, air driven pumps is advantageous in many applications.

A virtual stall pressure can be created for a progressive cavity pump which is otherwise able to deliver material at extremely high pressures. Motor torque is used as the sensed input. The motor controller(s) 30, 32 controlling the motor (s) 39, 41 uses a micro controller to send torque commands to a pulse width modulation (PWM) amplifier that drives the motor(s) 39,41. An optical encoder(s) 38, 40 is associated with the motor(s) 39, 41 to sense motor position. Signals are sent back to the micro controller(s) of the motor controller(s) 30, 32. With this system, the micro controller(s) is able to control torque at any given speed.

To provide a virtual stall pressure to the pump(s) 34, 36 by measuring torque and speed, a table or curves establishing the relationships between torque and pressure at different speeds is used. A calibration scheme is employed to establish these relationships. The controller(s) 30, 32 is programmed to run the pump(s) 34, 36 at an appropriate operative velocity. With this velocity obtained, the output pressure of the pump(s) 34, 36 is adjusted. The torque is then read by the micro controller(s) at a number of pressure set points. To maintain a constant speed, the imposition of higher pressures creates greater torque demands on the motor. Effectively, a family of curves of torque vs. pressure are generated with each curve representing a different pump speed. Given a pump speed and the torque required to maintain that speed, output pressure may be determined from the table or curves. This calibration procedure is illustrated in FIG. 33 where a pump velocity is set (Step 584), a valve is positioned on the outlet from the pump to set operating pressure (Step 585) and the resulting torque is sensed (Step 586). From the foregoing, a torque profile is established (Step 587) to set maximum torque limits at specific speeds to act as a virtual stall pressure downloaded to the controller (Step 588).

Turning to the operation of the virtual stall system as illustrated in FIG. 34, speed is to be the constant until a stall condition is approached. The actual speed is compared with the target speed (Step 589). A PID algorithm is used to compute a torque command to a PWM amplifier (Step 590). This torque command is compared with the calibrated pressure based on the pump speed (Step 591). If the pressure would exceed the limit, the torque command is set at the limit (Step 592). If not, the torque command is unchanged and implemented (Step 593). The rate of torque change may also be used at Step 590 to assist in avoiding overpressure.

A final embodiment has been developed to provide a high flow rate of dispensing. In providing the higher rate, the dispense head 49 of the first embodiment is not employed. Rather, the devices of FIGS. 35 through 38 are substituted between the motors 34 and 36 and the static mixer tube 50. The static mixer tube 50 may also be reconfigured to accommodate the higher flow. The pump fluid lines 46 and 48 enter a housing 600. Ball valves 602 and 604 are positioned in the material inlets 46 and 48, respectively. The ball valves 602 and 604 include crank arms 606 and 608. These crank arms are coupled with a clevis 610. The clevis 610 is coupled with a pneumatic piston 612 which can move the clevis 610 in either direction. With movement of the clevis 610, the crank arms 606 and 608 pivot about the ball valves 602 and 604 to open and close same.

A releasably coupled manifold 613 receives the pump fluid lines 46 and 48 past the ball valves 602 and 604. The manifold 613 includes passages 614 and 616 through a block 618. The passage 614 is coupled with a tube 620 while the passage 616 is coupled with a tube 622. The tubes 620 and 622 are illustrated to be of substantially different diameter, contemplating the use of mixtures of paints with pigments and resins with accelerators, for example. The tube 620 is shown to extend to a concentric discharge within the tube 622. The use of a concentric discharge avoids the difficulty of having a high percentage of the smaller volume introduced remain unmixed at the wall of the larger tube. A poppet valve 624 is spring biased to the closed position such that only pressure within the tube 620 will allow communication between the tube 620 and 622. A mixer 50 may be appropriately employed downstream of the manifold 613. The mixer would be coupled in pressure communication with the tube 622.

Figure 38:
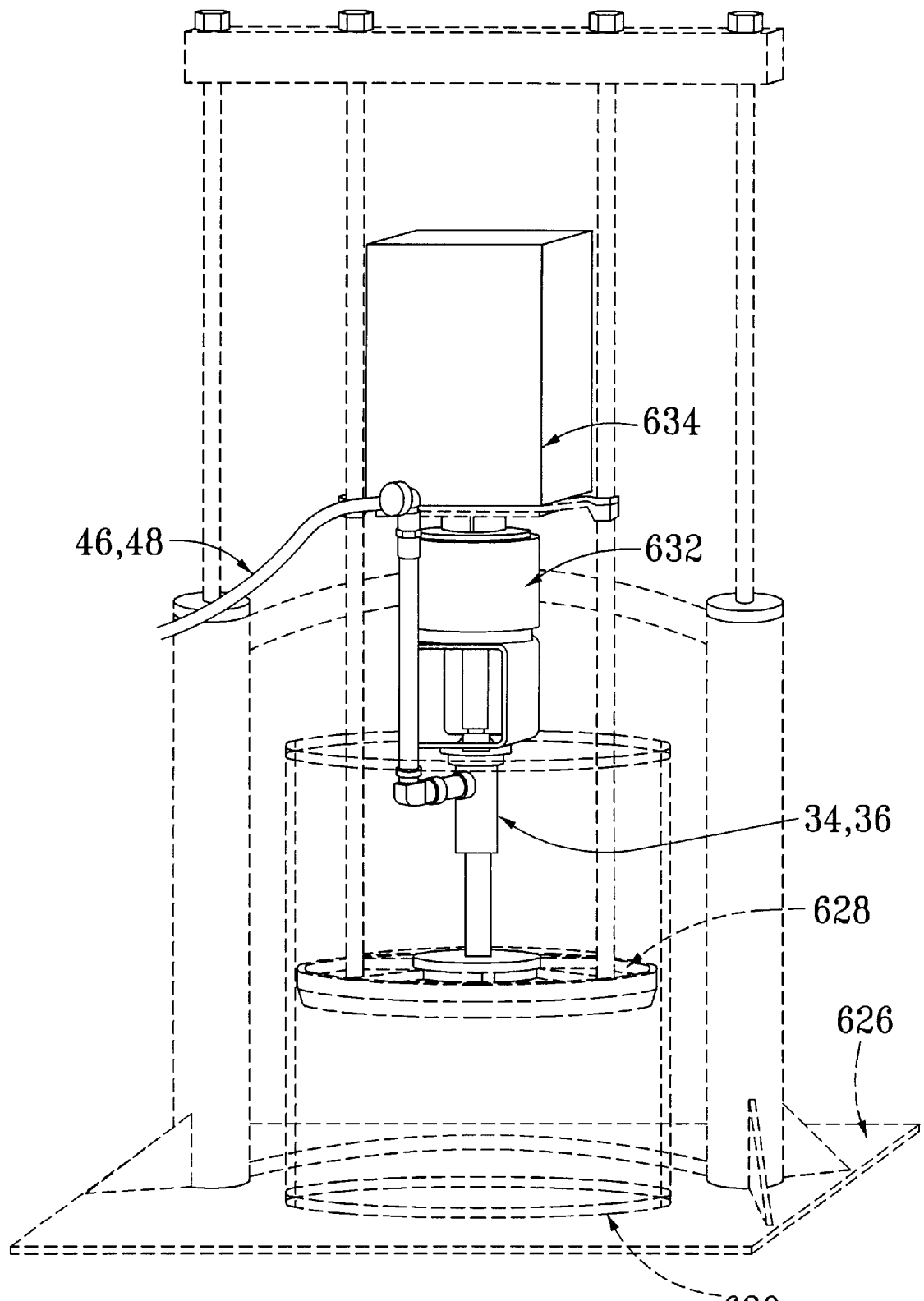
FIG. 38 is a perspective view of a progressive cavity pump, gearbox and motor assembly with a supply drum and drum ram illustrated in phantom.

With any of the embodiments, drum rams may be employed such as illustrated in FIG. 38. A drum ram 626 includes a frame which slidably supports a follower plate 628. The follower plate is set down within a drum 630 and rests upon the surface of the fluid contained within the drum 630. A seal may be provided about the follower plate 628 to eliminate evaporation, etc. and wipe the walls of the drum 630 as the follower plate 628 moves downwardly.

The drum ram is shown to include a progressive cavity pump 34, 36 which is able to draw liquid through the follower plate 628. A pump fluid line 46, 48 transmits the fluid pumped from the drum 630 to the dispensing system. Associated with the progressive cavity pump 34, 36 is a gear box 632. A motor 34, 36 and controller 30, 32 assembly are contained within a housing 634.

While the invention is susceptible to various modifications and alternative forms, specific examples thereof have been shown by way of example in the drawings and are herein described in detail. It should be understood, however, that is not intended to limit the invention to the particular forms disclosed, but on the contrary, the invention is to cover all modifications, equivalents, and alternatives falling within the spirit and scope of the invention as defined by the following claims.

What is claimed is:

1. A dispensing system comprising
   a plurality of progressive cavity pumps;
   a mixer in communication with the progressive cavity pumps;
   a conduit having an outlet, the conduit being in pressure flow communication between the mixer and the outlet;
   a pressure sensor in communication with the pressure flow to the outlet;
   a plurality of motors, the motors being coupled to the progressive cavity pumps, respectively;
   a controller in signal communication with the pressure sensor and with the motors, the controller being responsive to pressure input from the pressure sensor to control the motors based on the pressure sensed by the pressure sensor and on the pressure sensed by the pressure sensor as a function of time.

2. The dispensing system of claim 1, the controller being responsive based on pressure as a function of time with the with the pressure approaching a preset maximum pressure.

3. The dispensing system of claim 1, the controller having repetitive pressure sampling with the motors on or off, the controller having a motor START mode with the pressure below a preselected lower pressure and a motor STOP mode with the pressure above a preselected upper pressure.

4. The dispensing system of claim 3, the controller having a motor LOW FLOW mode with an increase in pressure above a preselected rate.

5. The dispensing system of claim 4, the controller having a timer and an END OF CYCLE mode activated at a preselected time beyond the last STOP mode.

6. The dispensing system of claim 3, the controller having a time OSCILLATION mode following the STOP mode, the OSCILLATION mode being with the progressive cavity pump periodically cycling portions of a revolution backward and forward.

7. A method for pressure dispensing with a mixture of materials from progressive cavity pumps driven by motors, respectively, through a conduit, comprising
   driving the pumps;
   mixing the pumped materials;
   repeatedly sampling pressure of the mixed pumped materials;
   sending a signal from the controller to turn off the pumps when pressure of the mixed pump materials rises above a preselected high pressure;
   sending a signal from the controller to turn on the pumps when pressure of the mixed pump materials falls below a preselected low pressure;
   reducing the driving speed of the pumps when a rate of pressure increase of the mixed pump materials exceeds a preselected amount.

8. The method of claim 7, driving the pumps, turning on the pumps and turning off the pumps each acting on all the pumps at the same times, the pumps being driven at fixed proportion speeds.

9. The method of claim 7 further comprising in seriatim
   timing each period between turning the pumps off and turning the pumps on;

stopping the charging when the period exceeds a preset value;

cycling the pumps on a periodic basis when the charging is stopped including rotating the progressive cavity pumps a partial turn in a first direction, rotating the progressive cavity pumps a partial turn in a second direction, comparing the pressure in the conduit after rotating the progressive cavity pumps in the second direction with the pressure in the conduit before rotating the progressive cavity pumps in the first direction, again rotating the progressive cavity pumps a partial turn in the first direction, again rotating the progressive cavity pumps a partial turn in the second direction, including changing the amount of rotation in the second direction if the compared pressure after rotation is different from the pressure before rotation.

10. A dispensing system maintaining a target pressure during dispensing, comprising a progressive cavity pump having an outlet;

a motor coupled with the progressive cavity pump;

a pump control system controlling the motor and including a preset target pressure;

a pressure sensor in pressure communication with the pump outlet and in signal communication with the pump control system, pump speed being controlled as a function of the differential pressure between actual pressure of the pressure sensor and the preset target pressure by the pump control system.

11. The dispensing system of claim 10, the pump control system further including a PID loop, pump output flow being controlled through the PID loop as a function of the differential pressure between actual pressure of the pressure sensor and the preset target pressure.

12. The dispensing system of claim 11, the pump control system further including a PWM amplifier in electrical communication with the motor, pump output flow being controlled through the PWM amplifier.

13. The dispensing system of claim 11, the function being $$Q = G_p \cdot dP_s + G_i \cdot (dP_s + dP_{s-1}) + G_d \cdot (dP_s - dP_{s-1}).$$

where Q is flow rate of the pump, $G_p$ is the proportional gain, $G_i$ is the integral gain, $G_d$ is the derivative gain and $dP_s$ is the differential between the target pressure and the actual pressure with the subscript s denoting successive pressure samples.

14. The dispensing system of claim 10, the function being $$Q = G_p \cdot dP_s + G_i \cdot (dP_s + dP_{s-1}) + G_d \cdot (dP_s - dP_{s-1}).$$

where Q is flow rate of the pump, $G_p$ is the proportional gain, $G_i$ is the integral gain, $G_d$ is the derivative gain and $dP_s$ is the differential between the target pressure and the actual pressure with the subscript s denoting successive pressure samples.

15. A method for maintaining a target pressure during dispensing using a pump control system, comprising controlling the speed of a progressive cavity pump with the pump control system;

repeatedly sensing pressure of the output of the pump;

providing the sensed pressure to the pump control system;

storing a target pressure in the pump control system;

adjusting control of the progressive cavity pump with the pump control system as a function of the differential pressure between actual pressure of the pressure sensor and the preset target pressure.

16. The method of claim 15, the function being $$Q = G_p \cdot dP_s + G_i \cdot (dP_s + dP_{s-1}) + G_d \cdot (dP_s - dP_{s-1}).$$

where Q is flow rate of the pump, $G_p$ is the proportional gain, $G_i$ is the integral gain, $G_d$ is the derivative gain and $dP_s$ is the differential between the target pressure and the actual pressure with the subscript s denoting successive pressure samples.

17. A method for maintaining a target pressure using a controller during the dispensing through a mixer of a mixture of materials from progressive cavity pumps driven by motors, respectively, comprising repeatedly sensing pressure of the output of at least one of the pumps;

providing representations of the repeatedly sensed pressure to the controller;

storing a target pressure;

driving the motors at proportional speeds;

mixing the materials from the progressive cavity pumps;

sending signals from the controller to adjust the proportional speeds of the motors as a function of the differential pressure between actual pressure of the pressure sensor and the preset target pressure.

18. The method of claim 17, the function being a PID loop.

19. The method of claim 17, the function being $$Q = G_p \cdot dP_s + G_i \cdot (dP_s + dP_{s-1}) + G_d \cdot (dP_s - dP_{s-1}).$$

where Q is flow rate of the pump, $G_p$ is the proportional gain, $G_i$ is the integral gain, $G_d$ is the derivative gain and $dP_s$ is the differential between the target pressure and the actual pressure with the subscript s denoting successive pressure samples.

20. The method of claim 17 further comprising sending a signal from the controller to turn off the pumps when pressure of the mixed pump materials rises above a preselected high pressure;

sending a signal from the controller to turn on the pumps when pressure of the mixed pump materials falls below the target pressure.

21. A method for maintaining a target pressure using a controller during the dispensing through a mixer and a valve controlled nozzle from the mixer of a mixture of materials from progressive cavity pumps driven by motors, respectively, comprising repeatedly sensing pressure of the output of at least one of the pumps;

providing representations of the repeatedly sensed pressure to a controller;

storing a target pressure;

driving the motors at proportional speeds;

mixing the materials from the progressive cavity pumps;

sending signals from the controller to adjust the proportional speeds of the motors as a function of the differential pressure between actual pressure of the pressure sensor and the preset target pressure;

opening and closing the valve controlled nozzle independently of the sampled pressure.

22. The method of claim 21, the function being a PID loop.

23. The method of claim 21, the function being $$Q = G_p \cdot dP_s + G_i \cdot (dP_s + dP_{s-1}) + G_d \cdot (dP_s - dP_{s-1}).$$

where Q is flow rate of the pump, $G_p$ is the proportional gain, $G_i$ is the integral gain, $G_d$ is the derivative gain and $dP_s$ is the differential between the target pressure and the actual pressure with the subscript s denoting successive pressure samples.

24. The method of claim 21 further comprising selectively closing the valve; stabilizing the pressure between the progressive cavity pumps and the valve with the valve closed, including in periodic cycles, in seriatim for each pump, measuring the sampled pressure a first time, rotating the progressive cavity pump a partial turn in a first direction, rotating the progressive cavity pump a partial turn in a second direction opposite to the first direction, measuring the sampled pressure a second time, and comparing the second measurement of the sampled pressure with the first measurement of the sampled pressure, the rotation of the progressive cavity pump a partial turn in the second direction including changing the amount of rotation in the second direction if the sampled pressure after rotation was different from the sampled pressure before rotation in the just prior cycle.

25. A dispensing system maintaining a target pressure during dispensing, comprising a plurality of progressive cavity pumps;

a mixer in communication with the plurality of progressive cavity pumps;

a plurality of motors, the motors being coupled with the progressive cavity pumps, respectively;

a pump control system controlling the motors to drive the pumps at proportional speeds and including a preset target pressure;

a pressure sensor in pressure communication with the output of at least one of the plurality of progressive cavity pumps and in signal communication with the pump control system, pump speeds being controlled as a function of the differential pressure between actual pressure of the pressure sensor and the preset target pressure by the pump control system.

26. The dispensing system of claim 25, the pump control system further including a PID loop, proportional pump speeds being controlled through the PID loop as a function of the differential pressure between actual pressure of the pressure sensor and the preset target pressure.

27. The dispensing system of claim 26, the pump control system further including a PWM amplifier in electrical communication with the motor, proportional pump speeds being controlled through the PWM amplifier.

28. The dispensing system of claim 25, the function being $$Q = G_p \cdot dP_s + G_i \cdot (dP_s + dP_{s-1}) + G_d \cdot (dP_s - dP_{s-1}).$$

where Q is flow rate of the pump, $G_p$ is the proportional gain, $G_i$ is the integral gain, $G_d$ is the derivative gain and $dP_s$ is the differential between the target pressure and the actual pressure with the subscript s denoting successive pressure samples.

29. The dispensing system of claim 25 further comprising a nozzle;

a conduit in flow communication between the mixer and the nozzle.

30. The dispensing system of claim 29 further comprising a valve in the nozzle.

31. The dispensing system of claim 29, the valve being controlled independently of the pump control system.

32. The dispensing system of claim 31 further comprising a valve in the nozzle.

33. The dispensing system of claim 31, the valve being controlled independently of the pump control system.

34. The dispensing system of claim 10 further comprising a nozzle;

a conduit in flow communication between the mixer and the nozzle.

* * * * *